US009369712B2

(12) United States Patent
Ye et al.

(10) Patent No.: US 9,369,712 B2
(45) Date of Patent: Jun. 14, 2016

(54) BUFFERED ADAPTIVE FILTERS

(75) Inventors: Yan Ye, San Diego, CA (US);
Alexandros Tourapis, Milpitas, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 823 days.

(21) Appl. No.: 13/521,118

(22) PCT Filed: Jan. 5, 2011

(86) PCT No.: PCT/US2011/020163
§ 371 (c)(1),
(2), (4) Date: Jul. 9, 2012

(87) PCT Pub. No.: WO2011/087932
PCT Pub. Date: Jul. 21, 2011

(65) Prior Publication Data
US 2013/0142262 A1 Jun. 6, 2013

Related U.S. Application Data

(60) Provisional application No. 61/295,034, filed on Jan. 14, 2010.

(51) Int. Cl.
*H04N 7/26* (2006.01)
*H04N 19/80* (2014.01)
(Continued)

(52) U.S. Cl.
CPC ......... *H04N 19/0089* (2013.01); *H04N 19/117* (2014.11); *H04N 19/136* (2014.11); *H04N 19/172* (2014.11); *H04N 19/174* (2014.11); *H04N 19/176* (2014.11); *H04N 19/182* (2014.11); *H04N 19/196* (2014.11);

(Continued)

(58) Field of Classification Search
CPC . H04N 19/0089; H04N 19/176; H04N 19/70; H04N 19/172; H04N 19/196; H04N 19/82; H04N 19/136; H04N 19/182; H04N 19/174; H04N 19/80; H04N 19/117
USPC ...................................................... 375/240.16
See application file for complete search history.

(56) References Cited

U.S. PATENT DOCUMENTS 7,489,342 B2   2/2009  Xin et al.
8,149,910 B2   4/2012  Tanizawa et al.
(Continued)

FOREIGN PATENT DOCUMENTS

CA   2671180 A1 * 6/2008
CN   1386380      12/2002
(Continued)

OTHER PUBLICATIONS

ITU, "Advanced Video Coding for Generic Audiovisual Services" Nov. 2007.
(Continued)

*Primary Examiner* — Christopher S Kelley
*Assistant Examiner* — Zhihan Zhou

(57) ABSTRACT

A buffer is established in a video encoder and/or a video decoder. An adaptive filter is buffered in the established buffer. An input video signal is coded using the buffered filter. The filter buffer may be managed, e.g., as to buffer size or capacity, filter placement within the buffer, and buffered default filters. Adaptive filters may be signaled and buffered for multiple reference pictures.

20 Claims, 10 Drawing Sheets

(51) Int. Cl.

| | |
|---|---|
| *H04N 19/176* | (2014.01) |
| *H04N 19/70* | (2014.01) |
| *H04N 19/172* | (2014.01) |
| *H04N 19/196* | (2014.01) |
| *H04N 19/117* | (2014.01) |
| *H04N 19/136* | (2014.01) |
| *H04N 19/182* | (2014.01) |
| *H04N 19/174* | (2014.01) |
| *H04N 19/82* | (2014.01) |

(52) U.S. Cl.
CPC .............. *H04N 19/70* (2014.11); *H04N 19/80* (2014.11); *H04N 19/82* (2014.11)

(56) References Cited

U.S. PATENT DOCUMENTS

| | | | |
|---|---|---|---|
| 2003/0169931 A1* | 9/2003 | Lainema | 382/236 |
| 2004/0252758 A1* | 12/2004 | Katsavounidis et al. | 375/240.2 |
| 2006/0023782 A1 | 2/2006 | Cai et al. | |
| 2006/0083308 A1 | 4/2006 | Schwarz | |
| 2006/0268991 A1 | 11/2006 | Segall | |
| 2008/0095264 A1* | 4/2008 | Deng et al. | 375/296 |
| 2009/0316779 A1* | 12/2009 | Fukuhara et al. | 375/240.02 |
| 2010/0061447 A1 | 3/2010 | Tu | |

FOREIGN PATENT DOCUMENTS

| | | |
|---|---|---|
| CN | 1787640 | 6/2006 |
| EP | 1631090 | 3/2006 |
| EP | 1720358 | 11/2006 |
| EP | 2048886 | 4/2009 |
| EP | 2048886 A1 * | 4/2009 |
| EP | 2262267 | 12/2010 |
| JP | 2004-147328 | 5/2004 |
| JP | 2006/081161 | 3/2006 |
| JP | 2007/159111 | 6/2007 |
| JP | 2009-296154 | 12/2009 |
| WO | 2007/063808 | 6/2007 |
| WO | 2008/069073 | 6/2008 |
| WO | 2009/126921 | 10/2009 |
| WO | 2010/123909 | 10/2010 |
| WO | 2011/005624 | 1/2011 |
| WO | 2011/087932 | 7/2011 |

OTHER PUBLICATIONS

SMPTE 421M, "VC-1 Compressed Video Bistream Format and Decoding Process", Apr. 2006.

Sullivan, G.J. et al., "Rate-Distortion Optimization for Video Compression", IEEE Signal Processing Magazine, vol. 15, Issue 6, Nov. 1998.

Vatis, Y. et al., "Comparison of Complexity Between Two-Dimensional Non-Separable Adaptive Interpolation Filter and Standard Wiener Filter", ITU-T SGI Doc. VCEG-AAII, Nice, France, Oct. 2005.

Rusanovskyy, D. et al., "Adaptive Interpolation with Directional Filters" ITU-T SGI 6/Q.6 Doc. VCEG-AG21, Shenzhen, China, Oct. 2007.

Motta, G. et al., "Improved Filter Selection for B-slices in E-AIF", VCEG-Al38, Berlin, Germany, Jul. 2008.

VCEG/KTA Reference Software JM11.0KTA2.3, Apr. 2009.

Chujoh, T. et al., "Improvement of Block-based Adaptive Loop Filter", VCEG-AJ13, San Diego, California, Oct. 2008.

Karczewicz, M. et al., "Post Filter with Reduced Delay Requirement", ITU-T/SG16/Q.6 document C.128, Geneva, Switzerland, Jan. 2009.

Salomon, D., "Data Compression: The Complete Reference" Jan. 1, 1998, New York, NY pp. 101-162.

Yan, Y. et al., "Buffered Adaptive Interpolation Filters" Multimedia and Expo, 2010 IEEE International Conference on IEEE, Piscataway, NJ, Jul. 19, 2010, pp. 376-381.

Tourapis, A.M. et al. "Dynamic Reference Generation for Advanced Video Coding" VCEG-W05, Redmond, Washington, Jul. 2004.

Gisle Bjoontegaard, et al. "Definition of New Coding Elements from Telenor" VCEG Meeting, May 16-19, 2000, Osaka, Japan, Video Coding Experts Group of ITU-T.

International Search Report issued on Mar. 30, 2011 for International Application No. PCT/US2011/020163 filed on Jan. 5, 2011 in the name of Dolby Laboratories Licensing Corporation.

Written Opinion issued on Mar. 30, 2011 for International Application No. PCT/US2011/020163 filed on Jan. 5, 2011 in the name of Dolby Laboratories Licensing Corporation.

International Preliminary Report on Patentability issued on May 4, 2012 for International Application No. PCT/US2011/020163 filed on Jan. 5, 2011 in the name of Dolby Laboratories Licensing Corporation.

International Search Report issued on Aug. 18, 2010 for International Application No. PCT/US2010/031701 filed on Apr. 20, 2010 in the name of Dolby Laboratories Licensing Corporation.

Written Opinion issued on Aug. 18, 2010 for International Application No. PCT/US2010/031701 filed on Apr. 20, 2010 in the name of Dolby Laboratories Licensing Corporation.

International Preliminary Report on Patentability issued on Jul. 27, 2011 for International Application No. PCT/US2010/031701 filed on Apr. 20, 2010 in the name of Dolby Laboratories Licensing Corporation.

Notice of Allowance issued May 22, 2015 for U.S. Appl. No. 13/257,579, filed Sep. 19, 2011 in the name of Yan Ye.

Non-Final Office Action issued Apr. 22, 2015 for U.S. Appl. No. 13/257,579, filed Sep. 19, 2011 in the name of Yan Ye.

Restriction Requirement issued Nov. 5, 2014 for U.S. Appl. No. 13/257,579, filed Sep. 19, 2011 in the name of Yan Ye.

* cited by examiner

Example Adaptive Filter Buffer 500

Filter buffer for pixel position X

| | |
|---|---|
| 0 | H.264/AVC filter |
| 1 | Bilinear /Bi-cubic filter |
| 2 | Adaptive filter A |
| 3 | Adaptive filter B |
| 4 | Adaptive filter C |
| 5 | Adaptive filter D |

FIG. 5

Example Hierarchical B Prediction 900

BUFFERED ADAPTIVE FILTERS

CROSS-REFERENCE TO RELATED APPLICATIONS

This application claims priority to U.S. Patent Provisional Application No. 61/295,034, filed 14 Jan. 2010, hereby incorporated by reference in its entirety.

TECHNOLOGY

The present invention relates generally to video filtering. More particularly, an embodiment of the present invention relates to buffered adaptive filters.

BACKGROUND

Video coding systems compress digital video signals so as to reduce the storage need and/or transmission bandwidth of such signals. Various video coding systems are used, including for example block-based, wavelet-based, and region-based systems, among others. Block-based systems are currently used and deployed somewhat more commonly than some of the other systems. Examples of block-based video coding systems include the international video coding standards MPEG1/2/4, VC-1 and MPEG-4 AVC/H.264.

In view of the widespread deployment, use and familiarity of block-based video coding systems, the description of example embodiments herein may, for purposes of simplicity, uniformity, familiarity and clarity refer more frequently to the block-based video coding than to other systems. Such reference should not be considered by way of limitation by any means however, but only for reasons of example, discussion and illustration.

Artisans skilled in fields related to video coding should understand readily that the embodiments and techniques described herein can be applied to any type of video coding, and are expressly not limited to block-based coding systems. Skilled video artisans should understand from the description that follows, that the techniques discussed are readily applicable to any video coding systems that apply adaptive filters for various purposes, such as for the purpose of using motion compensation and motion prediction to reduce and/or remove redundancy that may be inherent in various video signals.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 depicts example adaptive filter buffer, according to an embodiment of the present invention;

DESCRIPTION OF EXAMPLE EMBODIMENTS

Buffered adaptive filters are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to buffered adaptive filters. A buffer is established in one or more of a video encoder or a video decoder. One or more adaptive filters are buffered in the buffer. The filter buffer may be managed, e.g., as to buffer size or capacity, filter placement within the buffer, and buffered default filters. Adaptive filters may be signaled and buffered for multiple reference pictures. An embodiment of the present invention thus relates to buffered adaptive filters.

Example Video Encoder & Decoder

Figure 1A:
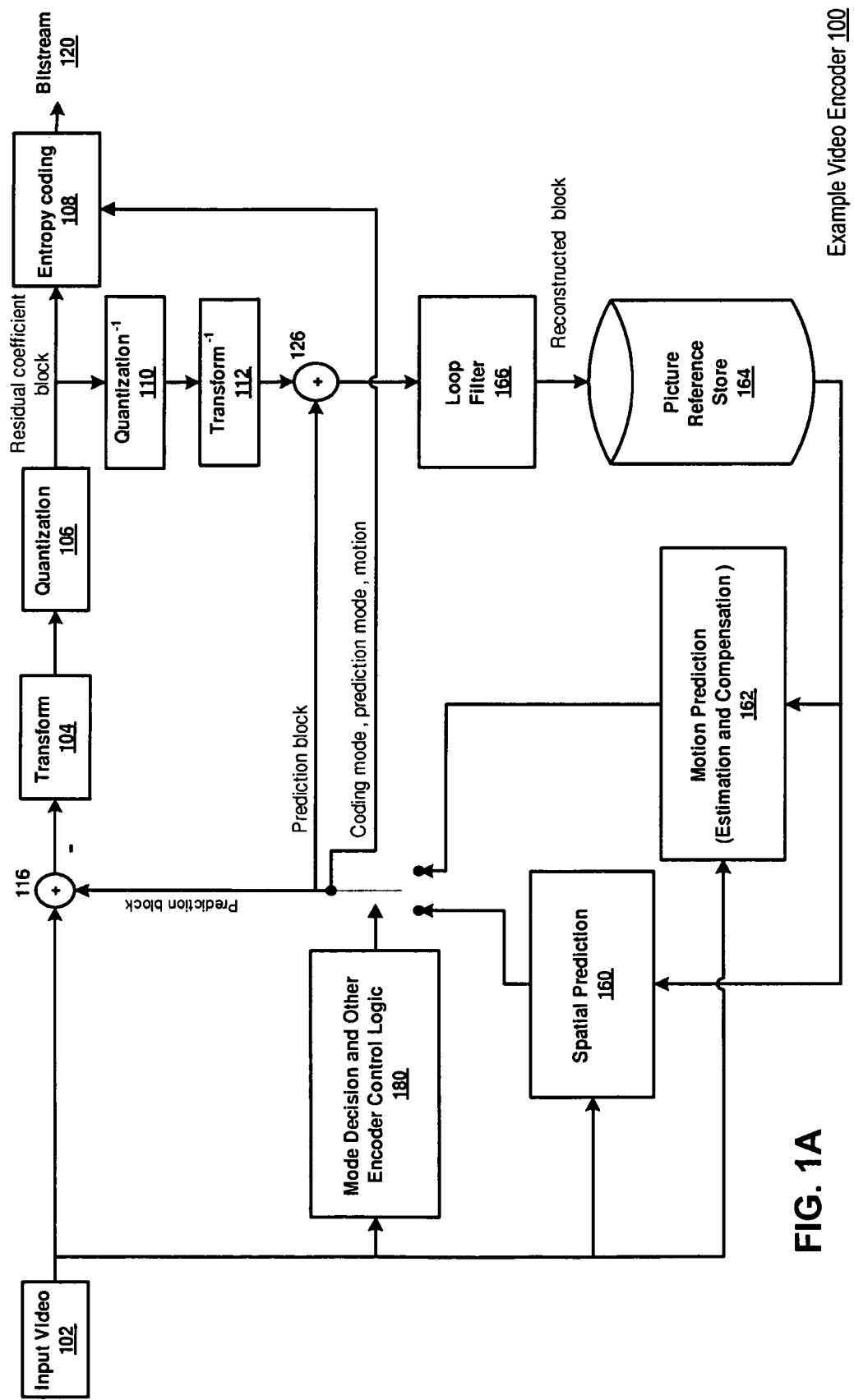
FIG. 1A depicts an example video encoding system and FIG. 1B depicts an example video decoder, according to an embodiment of the present invention.

An embodiment of the present invention relate to Buffered Adaptive Interpolation Filters. FIG. 1A depicts an example video coding system 100, according to an embodiment of the present invention. Example video coding system (e.g., encoder) 100 represents a block-based encoder. However, the block-based encoder 100 depicted should be understood as an example of any video coding system that uses motion estimation and compensation to reduce or remove redundancy, which may be inherent in some video systems. Reducing or removing such redundancy is useful for reducing storage and/or bandwidth demands associated with storing and/or transmitting video signals.

Example encoder 100 processes input video signal 102 block by block. A typically used video block unit consists of 16×16 pixels, which is commonly referred to as a macroblock. For each input video block, spatial prediction (160) and/or temporal prediction (162) may be performed. Spatial prediction 160, also commonly referred to as intra prediction, uses the already coded neighboring blocks in the same video picture/slice to predict the current video block.

Figure 1B:
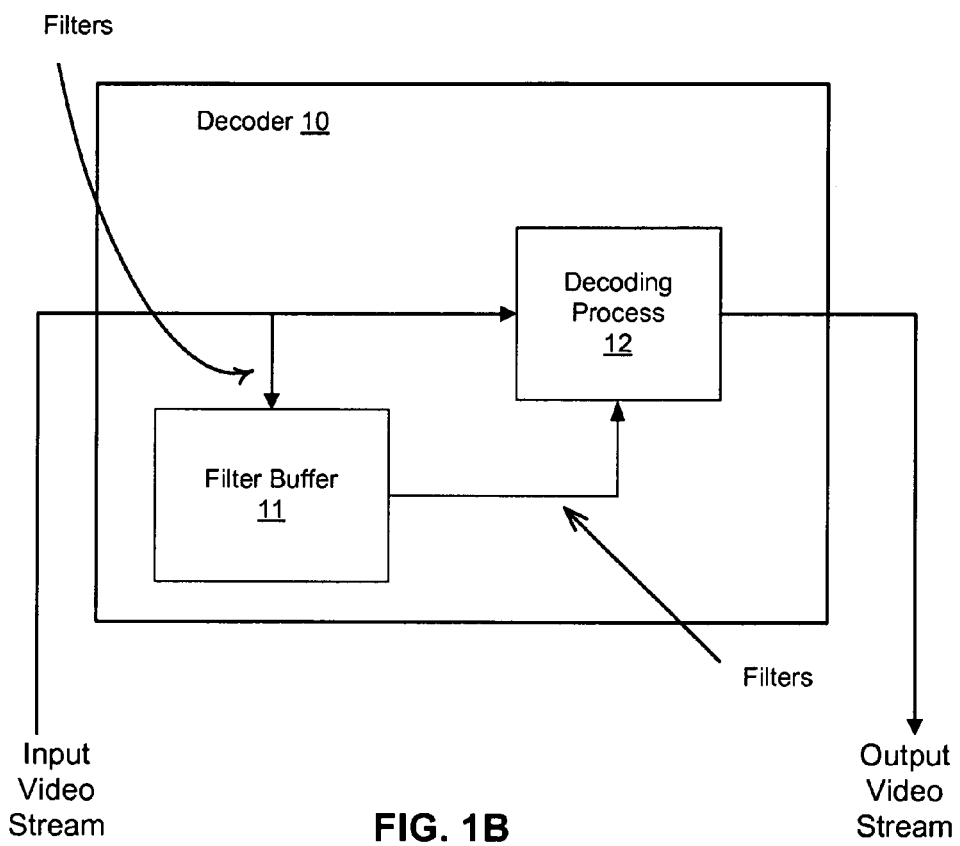

Temporal prediction 162 uses video blocks from neighboring video frames or pictures to predict the current video block. As used herein, the terms "frame" and "picture" are used essentially synonymously. The term "temporal prediction" is also commonly referred to as "inter prediction"; both terms are used herein essentially synonymously with the term "motion prediction." Temporal prediction may be performed on video blocks of various sizes. For example, for the luminance component, the MPEG-4 H.264/AVC video coding standard allows inter prediction block sizes such as 16×16, 16×8, 8×16, 8×8, 8×4, 4×8, and 4×4. FIG. 1B depicts an example video decoder 10, according to an embodiment of the present invention. Example video decoder 10 receives an input video stream (e.g., from video encoder 100). Example video decoder 10 includes a filter buffer 11, with which a decoding processor 12 may use adaptive filters, including adaptive interpolation filters, buffered therein to generate an output (e.g., decoded) video signal for display, storage or post-processing. The decoding processor 12 may include various decoding functions such as entropy decoding unit, spatial prediction unit, motion compensation unit, inverse quantization unit, inverse transform unit, loop-filter unit, and so on.

Figure 2:
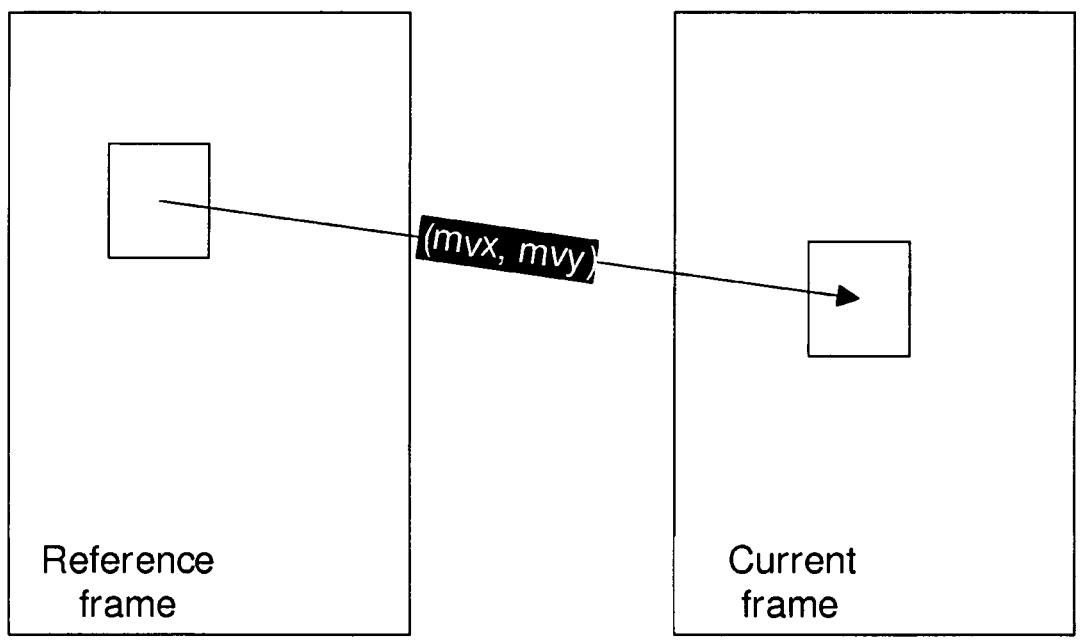
FIG. 2 depicts an example of motion compensation based temporal prediction, according to an embodiment of the present invention.

FIG. 2 depicts an example of motion compensation based temporal prediction, according to an embodiment of the present invention. Block-based motion prediction is provided with a motion vector (mvx,mvy). In FIG. 2, a case is depicted in which the prediction signal is taken from one reference picture. Multi-hypothesis temporal prediction may be provided, wherein the prediction signal is formed by combining a number of prediction signals from, for example, more than one reference picture. Bi-prediction, is an example of multi-hypothesis temporal prediction that is commonly used and supported over a number of widely used or adopted video coding standards such as MPEG2, MPEG4, MPEG-4H.264/AVC, and VC1.

Bi-prediction essentially combines two prediction signals, each from a reference picture, to form the prediction, for example using $P(x, y)=(P_0(x, y)+P_1(x, y)+1)>>1$, where $P_0(x, y)$ and $P_1(x, y)$ are the prediction signals for the location (x, y) from each reference picture, and P(x, y) is the final bi-prediction signal. Additionally, weights may be given to $P_0(x, y)$ and $P_1(x,y)$, such that $$P(x,y)=(w \cdot P_0(x,y)+(W-w) \cdot P_1(x,y)+W/2)>>S$$

wherein W and S respectively represent a weighting factor and a bit shift for fixed-point operation, and W=1<<S. This process is commonly referred to as weighted prediction. In addition to combining multiple temporal prediction signals, multi-hypothesis prediction signal may also be formed by combining the spatial prediction and the temporal prediction signals together.

After spatial and/or temporal predictions are performed, the prediction block is subtracted from the original video block at summer 116. The residual block is transformed at transform unit 104 and quantized at quantization unit 106. The quantized residual transform coefficients are then sent to entropy coding unit 108 to be entropy coded to further reduce bit rate. The entropy coded residual coefficients are then packed to form part of the output video bitstream 120.

The quantized transform coefficients are inverse quantized at inverse quantization unit 110 and inverse transformed at inverse transform unit 112 to obtain the reconstructed residual block. The reconstructed video block is formed by adding the reconstructed residual block to the prediction video block at summer 126 and added to the reference picture store 164. The reconstructed video block may also go through additional processing at loop filter unit 166 (e.g., in-loop deblocking filter as in H.264/AVC MPEG-4) before being placed in reference picture store 164. The reference picture store 164 may be used for coding of future video blocks in the same video frame and/or in future video frames.

Figure 3:
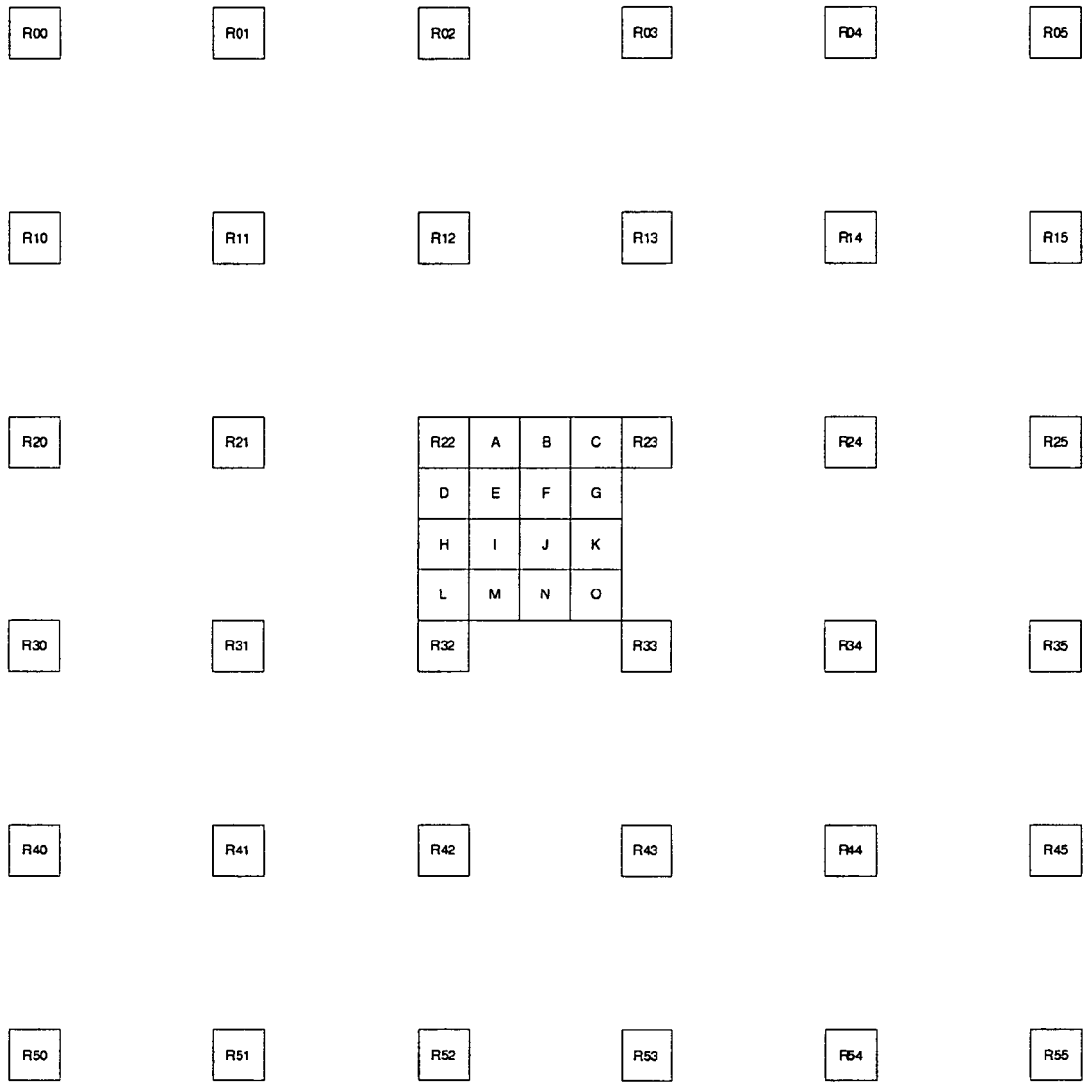
FIG. 3 depicts an example of fractional pixel based motion interpolation, according to an embodiment of the present invention.

Motion prediction or motion compensation at unit 162 may be performed with fractional-pixel precision. For example, the H.264/AVC MPEG-4 standard allows motion vectors to have ½-pixel and ¼-pixel precision for the luma component and the chroma components. Further, the Standard also allows ⅛-pixel motion precision for the chroma components if the input video has 4:2:0 color format. When a motion vector points to a fractional pixel position, motion interpolation is used to obtain the fractional-pixel values by interpolating from integer-pixel values in the reference picture. As used herein, the term "motion interpolation" is used essentially synonymously with the terms "motion estimation/compensation interpolation" and "motion prediction interpolation" in relation to the interpolation of spatial information related to pixels between frames. Assuming motion precision of full-pixel, ½-pixel, and ¼-pixel is allowed (although any other precision may be used), and assuming 6-tap interpolation filter as an example (although any other filter tap length, including 2-D non-separable filters, may also be used). FIG. 3 depicts an example of fractional pixel based motion interpolation, according to an embodiment of the present invention.

In FIG. 3, the interpolation relationship between the integer-pixel positions (shaded) and the fractional-pixel (½- and ¼-) positions (white) is shown. The horizontal positions X, X∈{A,B,C} will be interpolated using the following filter:

$$P^X = \sum_{n=0}^{5} h_n^X \cdot R_{2n} \qquad (1)$$

The vertical positions X, X∈{D,H,L} will be interpolated using the following filter:

$$P^X = \sum_{n=0}^{5} h_n^X \cdot R_{n2} \qquad (2)$$

The remaining 2-D fractional-pixel positions X, X∈{E,F,G,I,J,K,M,N,O} are interpolated using the following filter:

$$P^X = \sum_{n=0}^{5} \sum_{m=0}^{5} h_{mn}^X \cdot R_{mn} \qquad (3)$$

wherein $h_{mn}^X$ or $h_n^X$ denote the filter coefficients for position X, X∈{A,B . . . O}, and $R_{mn}$ denotes the integer-pixel positions in the reference picture surrounding the position to be interpolated. When the pixel values used in the interpolation filter equations are outside of the picture boundaries, padding may commonly be used.

The 1-D (one dimensional) filters in equations (1) and (2) used to interpolate the horizontal and vertical positions X, X∈{A,B,C,D,H,L} are given only as an example; these positions may be interpolated using 2-D (two dimensional) non-separable filters, e.g., in a way similar to equation (3), as well. Fixed-point operations (e.g., 16-point arithmetic) involving rounding and shifting may also (or alternatively) used during motion interpolation.

Adaptive interpolation filters for motion prediction can significantly improve motion prediction accuracy and thus coding performance. For example, in contrast to using fixed interpolation filters, adaptive interpolation filters may derive the filter coefficients $h_n^X$ and $h_{mn}^X$ adaptively based on statistics related to the original input video. These filter coefficients may then be predicted, quantized, and sent with (e.g., as part of) the video bitstream.

Example Adaptive Interpolation Filtering

The adaptive filter coefficients $h_n^X$ and $h_{mn}^X$ in equations (1) to (3) are derived based on minimizing a pre-defined distortion measure. For example, if Sum of Squared Error (or equivalently, the prediction error energy) is used as the distortion measure, then the filter coefficients are derived by minimizing $$SSE = \sum_{(x,y)} (O(x,y) - P(x,y))^2 \quad (4)$$

where $O(x, y)$ and $P(x, y)$ represent the input video signal and the predicted video signal at location $(x, y)$. For each sub-pixel positions X, $X \in \{A, B \ldots O\}$, the predicted signal $P^X(x, y)$ can be further computed as $$P^X(x, y) = \sum_{m=0}^{M} \sum_{N=0}^{N} h_{mn}^X R(x - mvx_{int} - m + FO_x, y - mvy_{int} - n + FO_y))^2 \quad (5)$$

wherein $R(x, y)$ represents the integer-pixel value in the reference at location $(x, y)$, $h_{mn}^X$ represents the filter coefficient corresponding to sub-pixel position X, $(mvx_{int}, mvy_{int})$ represent the integer portions of the motion vector $(mvx, mvy)$, and $$FO_x = \frac{M}{2} - 1 \text{ and } FO_y = \frac{N}{2} - 1$$

represent the filter offsets in the horizontal and vertical dimension ($FO_x = FO_y = 2$ if 6-tap filter is used), respectively. The sub-pixel position X is also derived from the motion vector $(mvx, mvy)$. For example, if $mvx=0.5$ and $mvy=0.5$ (both have ½-pixel precision), then $X=J$, where J is as marked in FIG. 3.

Encoder 100 may use a linear optimization process to minimize the prediction error SSE (or any other distortion measure) in order to derive $h_{mn}^{X,opt}$. Ultimately, the optimal filter coefficients may be found by computing $$(R^T \cdot R) \cdot h^{X,opt} = R^T \cdot O \quad (6)$$

wherein $$h^{X,opt} = \begin{pmatrix} h_{0,0}^{X,opt} \\ \vdots \\ h_{M-1,N-1}^{X,opt} \end{pmatrix} \quad (7)$$

$$R = \begin{pmatrix} R_{0,0}^{pix_0} & \cdots & R_{M-1,N-1}^{pix_0} \\ \vdots & & \vdots \\ R_{0,0}^{pix_{L-1}} & \cdots & R_{M-1,N-1}^{pix_{L-1}} \end{pmatrix} \quad (8)$$

-continued $$O = \begin{pmatrix} O^{pix_0} \\ \vdots \\ O^{pix_{L-1}} \end{pmatrix}. \quad (9)$$

Thus, $R^T \cdot R$ represents the auto-correlation matrix of all the pixels in the reference picture, denoted by $R_{0,0}^{pix_0}, \ldots, R_{M-1,N-1}^{pix_{L-1}}$, that are involved in the interpolation process; and $P^T \cdot O$ represents the cross-correlation between all the pixels in the reference picture involved in the interpolation process and all the involved pixels in the current video picture/slice, denoted by $O^{pix_0} \ldots O^{pix_{L-1}}$. Once derived, the adaptive filter coefficients $h_{mn}^{X,opt}$ may be quantized, coded and sent with (e.g., in) the video bitstream. The adaptive filter coefficients may also be predicted before quantization.

However, even with prediction and quantization, the cost of sending the adaptive filter coefficients may be high. For example, where a 6-tap filter is used for horizontal and vertical sub-pixel positions X, $X \in \{A, B, C, D, H, L\}$ and a 6×6 2D filter is used for 2-D sub-pixel positions X, $X \in \{E, F, G, I, J, K, M, N, O\}$. In this situation, an encoder would send a total of (6×6+9×36)=360 coefficients for the 15 sub-pixel positions shown in FIG. 3, which may incur a significant bit cost for coefficient signaling. To reduce the cost associated with sending the filter coefficients, certain symmetry assumptions may be used in AIF to reduce the number of unique filter coefficients that need to be transmitted. Typically used symmetries include pixel symmetry and coefficient symmetry. Pixel symmetry and coefficient symmetry combined can significantly reduce the number of unique coefficients that need to be transmitted, hence the bit overhead incurred by AIF.

Figure 4A:
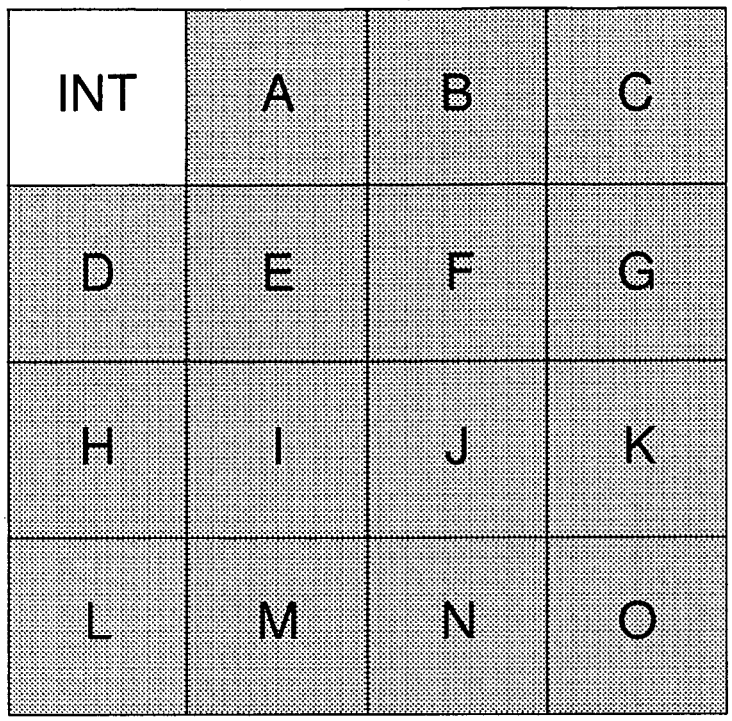
FIGS. 4A and 4B depict examples of sub-pixel symmetry, according to an embodiment of the present invention.
Figure 4B:
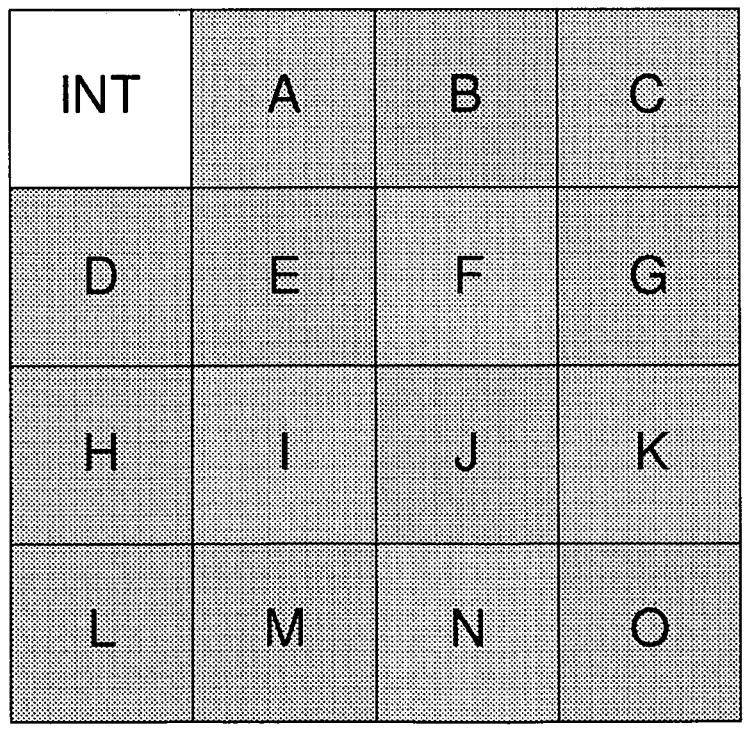

With pixel symmetry, a group of sub-pixel positions share the same filter. Thus, the filter for one sub-pixel position in the group may be obtained by flipping or transposing the filter for another sub-pixel position in the same group. FIGS. 4A and 4B depict examples of sub-pixel symmetry, according to an embodiment of the present invention. With pixel symmetry, a group of sub-pixel positions share the same filter. Thus, the filter for one sub-pixel position X in the group may be obtained by flipping or transposing the filter for another sub-pixel position in the same group. FIG. 4A and FIG. 4B depict two examples of pixel symmetry, wherein the sub-pixel positions that share the same filter are depicted using the same shaded pattern. For example, the filter for position A and the filter for position C (e.g., in FIG. 3) have the following relationship:

$$h_0^A = h_5^C, h_1^A = h_4^C, h_2^A = h_3^C$$

As used herein, the terms pixel symmetry group and/or simply symmetry group may be used essentially synonymously and may relate to groups of sub-pixel positions that share the same filter. Further details on obtaining the filters for each sub-pixel position in the symmetry group can be found in references that include:

Y. Vatis and J. Ostermann, "Comparison of complexity between two-dimensional non-separable adaptive interpolation filter and standard wiener filter," ITU-T SG1 6/Q.6 Doc. VCEG-AA11, Nice, France, October 2005;

S. Wittmann, T. Wedi, "Separable Adaptive Interpolation Filter," ITU-T SG16/Q.6 Doc. T05-SG16-C-0219, Geneva, Switzerland, June 2007;

D. Rusanovskyy, K. Ugur, J. Lainema, "Adaptive Interpolation with Directional Filters," ITU-T SG1 6/Q.6 Doc. VCEG-AG21, Shenzhen, China, October 2007;

Y. Ye and M. Karczewicz, "Enhanced Adaptive Interpolation Filter," ITU-T/SG16/Q.6 document C.464, Geneva, Switzerland, April 2008; and G. Motta, Y. Ye, and M. Karczewicz, "Improved Filter Selection for B-slices in E-AIF," VCEG-AI38, Berlin, Germany, July 2008, each of which is incorporated herein by reference for all purposes as if fully set forth herein (and which are filed herewith as appendices). Five (5) unique sub-pixel positions are shown in in FIG. 4A and eight (8) unique sub-pixel positions are shown in FIG. 4B.

With coefficient symmetry, for a given filter, only a subset of its coefficients is unique, whereas the complementary subset of coefficients can be derived from the first subset, typically by flipping or transposing. For example, the filter for sub-pixel positions B and H in FIG. 3 may have the relationship $$h_0^{B,H} = h_5^{B,H}, h_1^{B,H} = h_4^{B,H}, h_2^{B,H} = h_3^{B,H} \quad (10).$$

In some cases, filters with different characteristics may be applied for each of the horizontal and the vertical positions. For example, filters may be used that each has different tap lengths and/or symmetries, and/or 1-D filters and 2-D filters may each be used. Further, the filters for the luminance and the chrominance components may differ, e.g., in tap length, symmetry, 1-D "vs." 2-D filter, as well.

Examples of adaptive interpolation filter (AIF) schemes may be typified in Joint Model Key Technology Areas (JMKTA) software VCEG/KTA reference software JM11.0KTA2.3, (http://iphome.hhi.de/suchring/tml/download/KTA/), April, 2009. Y. Vatis and J. Ostermann, "Comparison of complexity between two-dimensional non-separable adaptive interpolation filter and standard wiener filter," ITU-T SGI 6/Q.6 Doc. VCEG-AA11, Nice, France, October 2005 describes a 2-dimensional (2D) non-separable AIF (2D-NS AIF). A 2D-NS AIF uses 6-tap filters for the 1D sub-pixel positions X, X∈{A,B,C,D,H,L} and 6×6 non-separable filters for the 2D sub-pixel positions X, X∈{E,F,G,I,J,K,M,N,O} 2D-NS AIF uses the pixel symmetry depicted in FIG. 4A.

S. Wittmann, T. Wedi, "Separable Adaptive Interpolation Filter," ITU-T SG16/Q.6 Doc. T05-SG16-C-0219, Geneva, Switzerland, June 2007 describes a separable AIF (S-AIF). S-AIF uses separable adaptive filters for the 2D sub-pixel positions X, X∈{E,F,G,I,J,K,M,N,O}. Interpolation is first applied in one dimension (e.g. horizontally) and then applied in the other dimension (e.g. vertically).

Directional AIF (D-AIF) is described in D. Rusanovskyy, K. Ugur, J. Lainema, "Adaptive Interpolation with Directional Filters," ITU-T SGI 6/Q.6 Doc. VCEG-AG21, Shenzhen, China, October 2007, wherein a D-AIF uses directional filters for the 2D sub-pixel positions X, X∈{E,F,G,I,J,K,M,N,O}. For sub-pixel positions X, X∈{E,G,M,O}, a 6-tap filter is used. For sub-pixel positions X, X∈{F,I,J,K,N}, a 12-tap filter is used.

Enhanced AIF (E-AIF) is described in Y. Ye and M. Karczewicz, "Enhanced Adaptive Interpolation Filter," ITU-T/SG16/Q.6 document C.464, Geneva, Switzerland, April 2008 and G. Motta, Y. Ye, and M. Karczewicz, "Improved Filter Selection for B-slices in E-AIF," VCEG-AI38, Berlin, Germany, July 2008. E-AIF uses 12-tap radial-shaped filter support for the 2D sub-pixel positions X, X∈{E,F,G,I,J,K,M,N,O}. E-AIF achieves pixel symmetry as depicted in FIG. 4B. E-AIF introduces integer-pixel position filtering and a filter offset. In E-AIF, the interpolation filters for the sub-pixel positions (e.g., positions depicted as white in FIG. 3) in equations (1-3) are modified slightly to take the form of equations (11-13) below, respectively. Further, the filter for the integer-pixel position (e.g., positions depicted as shaded in FIG. 3) take the form as in equation (14), below.

$$P^X = \sum_{n=0}^{N-1} h_n^X \cdot R_{2n} + Off^X \quad (11)$$

$$P^X = \sum_{n=0}^{N-1} h_n^X \cdot R_{n2} + Off^X \quad (12)$$

$$P^X = \sum_{n=0}^{N-1} \sum_{m=0}^{N-1} h_{mn}^X \cdot R_{mn} + Off^X \quad (13)$$

$$P^{INT} = \sum_{n=0}^{M-1} \sum_{m=0}^{M-1} h_{mn}^{INT} \cdot R_{mn} + Off^{INT} \quad (14)$$

Some AIF schemes (such as the E-AIF scheme) may apply adaptive filters to the integer pixel position as well. Thus, the terms adaptive interpolation filter and adaptive filter may be used interchangeably and essentially synonymously herein. Further, the terms sub-pixel position and pixel position may hereinafter relate collectively to the integer- and fractional-pixel positions.

Upon processing the costs of various alternatives, an encoder may, decide to not send an adaptive filter for any of the pixel positions, and instead use a pre-defined fixed filter, such as the interpolation filter specified in the MPEG-4 H.264/AVC standard codec. Such decisions may be made based on further controlling the cost of sending the filter coefficients and/or avoiding the additional interpolation complexity associated with adaptive filters. For example, to control the bit rate cost, the encoder can decide whether to use adaptive filters based on minimizing the rate-distortion based Lagrangian cost such as in equations 15 and/or 16, below.

$$J^{adapt} = D^{adapt} + \lambda \cdot r^{adapt} \quad (15)$$

$$J^{fix} = D^{fix} \quad (16)$$

In equations 15 and 16, $D^{adapt}$ and $D^{fix}$ represent distortions such as the Sum of Squared Error (SSE), Sum of Absolute Difference (SAD), or a subjective quality measure between the prediction signal and the original signal using the adaptive filter and the fixed filter, respectively. In equations 1t5 and 16, $r^{adapt}$ represents the rate or number of bits needed to code the filter coefficients, and λ represents the Lagrangian cost estimator or "lambda factor." The encoder may decide to use the fixed filter if $J^{fix} \leq J^{adapt}$ or use the adaptive filter if $J^{adapt} < J^{fix}$. The decision for each pixel position may be signaled in the video bitstream. For example, if a decision of one (1) may signal use of an adaptive filter, then the adaptive filter coefficients are included in the bitstream with the decision.

Some pixel symmetry may be used to reduce the number of unique filters, and thus the bit overhead associated with sending filter coefficients. Where pixel symmetry is thus used, the decision of whether to use an adaptive filter may be made collectively for all the pixel positions belonging to the same symmetry group (e.g, for the positions having the same shaded pattern in FIG. 4A and FIG. 4B). Thus, computations associated with equations (15) and (16) may be modified into equations (17) and (18) below, respectively. The encoder may thus base its decision on minimizing the rate-distortion cost or another coding criterion. If the encoder decides to use the adaptive filter, e.g., if $J^{adapt} < J^{fix}$, then the filter coefficients are sent and applied to all pixel positions belonging to the symmetry group.

$$J^{adapt} = \sum_{X \in symmetry \atop group} D^{adapt}(X) + \lambda \cdot r^{adapt} \quad (17)$$

$$J^{fix} = \sum_{X \in symmetry \atop group} D^{fix}(X) \quad (18)$$

In conventional AIF schemes, the adaptive filters are signaled on the picture/slice level, applied to the video blocks within the same picture/slice, and discarded at the end of coding the current picture/slice. In an embodiment of the present invention however, a Buffered Adaptive Filter (BAF) and/or a Buffered AIF (BAIF) scheme is used. In an embodiment, instead of being used and discarded at the end of coding a picture/slice, the adaptive filters from previous video frames/slices may be stored in a buffer and used to code video blocks in future pictures/slices. The BAF/BAIF framework may provide a very flexible foundation for improving the accuracy of motion prediction with relatively low bit overhead associated with filter signaling. BAF/BAIF related embodiments of the present invention may relate to one or more of adaptive filter decision, filter buffer management, or signaling of adaptive filters.

Example Buffered Adaptive Filters

An embodiment of the present invention relates to buffered adaptive filters. An embodiment of the present invention relates to buffered adaptive interpolation filters (BAIF). An example embodiment may be described in relation to a BAIF scheme. Description of an example embodiment in relation to a BAIF scheme is by way of example and is expressly not meant to be limiting to BAIF schemes. On the contrary, an embodiment of the present invention is well suited to function with BAFs and other buffered filter schemes in addition to BAIFs. Reference herein to a BAIF scheme is thus for simplicity, brevity and uniformity of the description and is not to be interpreted as limiting embodiments of the present invention thereto. FIG. 5 depicts example adaptive filter buffer 500, according to an embodiment of the present invention. Even with use of pixel and coefficient symmetries and applying filter decisions, adaptive filters may be costly to send in the bitstream. However, different video pictures in the same video sequence (e.g., pictures that share temporal proximity) may share significant common signal characteristics. In coding an input picture/slice, compared to using a pre-defined fixed filter, an embodiment of the present invention uses an adaptive filter that has been previously sent in the bitstream and buffered. An embodiment may thus economize on bit cost, because only a filter index may be signaled to identify which buffered filter is to be used. FIG. 5 shows an example for a filter buffer for the pixel position X, wherein $X \in \{INT, A, B, C \ldots, N, O\}$. Similar filter buffers may be maintained for each of the 16 pixel positions (assuming ¼-pixel precision motion prediction is used), or it may be maintained for a subset of the 16 pixel positions.

As shown in FIG. 5, a filter buffer may contain one or more commonly used fixed filters, such as one or more filters that are used with performing motion estimation/compensation interpolation for the one or more pixel positions, such as the H.264/AVC MPEG-4 Part 10 filter for the position X, the H.264/AVC MPEG-4 Part 10 filter for the position X, but with higher precision independent of (e.g., without) intermediate rounding and clipping. In an embodiment, a bi-linear and/or bi-cubic filter may be used. In an embodiment, one or more Lanczos filters (e.g., Lanczos-L2 and/or Lanczos-L3 filters) may also be used. Further, the filter buffer may be dynamically updated as encoding and decoding proceed. For example, as the encoder sends more adaptive filters (e.g., adaptive filter A, B, C, D in FIG. 5) for the position X, these filters can be added to the filter buffer so that they can be used for coding of future pictures/slices. Similarly, as a decoder receives more adaptive filters in the bitstream (e.g., adaptive filter A, B, C, D in FIG. 5) for the position X, it may add these filters to the filter buffer on the decoder side, so that they may be used for decoding of future pictures/slices. The encoder and the decoder may thus synchronize, e.g., stay in synchronism in this manner.

When some pixel symmetries are used, an encoder may make a decision (e.g., as to whether to use adaptive filter or a pre-defined fixed filter) collectively for all the pixel positions in the symmetry group. In an embodiment relating to BAIF scheme, the decision may be made according to one or more of the following criteria.

1. For each symmetry group, a flag, new_filter_flag, is sent to indicate whether a new adaptive filter is sent for the group;
2. For each pixel position in the symmetry group,
    a. If the flag new_filter_flag is 0 (no new filter is signaled), then the filter index in the filter buffer, filter_idx, is signaled;
    b. Otherwise, if the flag new_filter_flag is 1 (a new filter is signaled), then a flag, use_new_filter_flag, is signaled first;
3. If the flag use_new_filter_flag is 1, then nothing else needs to be signaled; or
4. If the flag use_new_filter_flag is 0, then the filter index in the filter buffer, filter_idx, is signaled.

Figure 6:
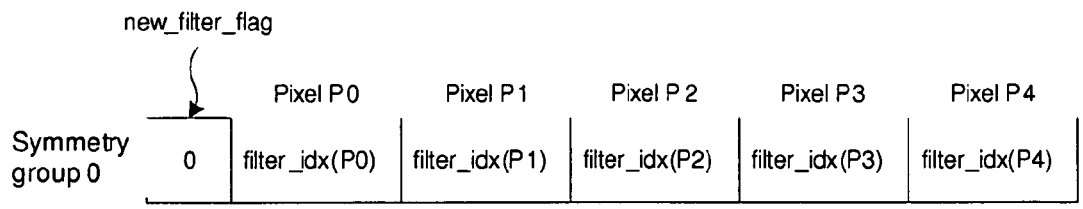
FIG. 6 depicts a first example of adaptive filter signaling for a buffered adaptive interpolation filter (BAIF) scheme, according to an embodiment of the present invention.
Figure 7:
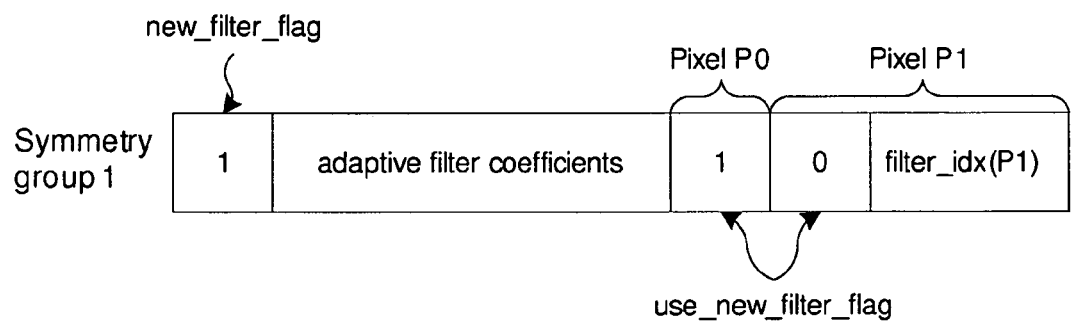
FIG. 7 depicts a second of adaptive filter signaling for a BAIF scheme, according to an embodiment of the present invention.

Two examples of the adaptive filter related signaling for the BAIF scheme are depicted in FIG. 6 and FIG. 7. FIG. 6 depicts a first example of adaptive filter signaling for a buffered adaptive interpolation filter (BAIF) scheme, according to an embodiment of the present invention. FIG. 7 depicts a second of adaptive filter signaling for a BAIF scheme, according to an embodiment of the present invention. In FIG. 6, the symmetry group 0 contains 5 pixel positions. For this symmetry group, first new_filter_flag=0 is sent; then for each pixel position $P_i$ in the symmetry group, filter_idx($P_i$) is sent to identify an existing filter in the filter buffer associated with $P_i$. In FIG. 7, the symmetry group 1 contains 2 pixel positions. For this symmetry group, first new_filter_flag=1 is sent, followed by the adaptive filter coefficients. For pixel position $P_0$, use_new_filter_flag=1 so nothing else needs to be signaled; for pixel position $P_1$, new_filter_flag=0 is sent, followed by filter_idx($P_1$) which identifies an existing filter in the filter buffer associated with $P_1$.

A BAIF scheme according to an embodiment may significantly reduce bandwidth costs associated with using adaptive filters (e.g., only filter_idx is signaled to use an existing filter). Moreover, a BAIF scheme according to an embodiment may allow pixel positions in the same symmetry group to use different filters, instead of tying them all to the same filter, as with conventional AIF schemes. Thus, an embodiment allows each pixel position significant flexibility in selecting a filter that matches or fits its corresponding signal characteristics. Moreover, an embodiment may further reduce a pre-defined distortion measure, e.g., SSE in equation (4), between the input video signal and the predicted video signal.

In an embodiment relating to a BAIF scheme, an encoder decision regarding whether to send an adaptive filter or use an existing filter that is buffered in the filter buffer can be made using the in the following process steps.

1. Derive an adaptive filter for an entire symmetry group, e.g., with equation (6), and the process described in relation to making a decision as to whether to use adaptive filter or a pre-defined fixed filter collectively, for all of the pixel positions in the symmetry group.

2. Quantize the filter coefficients.

3. For each pixel position in the symmetry group, an encoder selects a filter based on a certain coding criterion (such as the Lagrangian bitrate versus distortion cost). The possible choices that the encoder may consider include the new adaptive filter, or any filter in the filter buffer associated with the given pixel position. In an embodiment, a rate-distortion based Lagrangian cost is used. In the present embodiment, the filter that minimizes the Lagrangian rate-distortion cost may be selected. Additionally or alternatively, an embodiment may use another pre-defined coding criterion.

4. If all the pixels in the symmetry group choose an existing filter in their respective filter buffer, then no new adaptive filter will be sent for the symmetry group (e.g., new_filter_flag=0).

5. Otherwise (some pixel positions in the symmetry group choose the new adaptive filter), an embodiment first excludes pixel positions that choose an existing filter in their respective filter buffer, and then re-computes the adaptive filter using only the statistics of the remaining pixels in the symmetry group.

6. For each remaining pixel in the symmetry group (e.g., which did not choose an existing filter in step 2), again select a filter as either the new adaptive filter or any existing filter in the filter buffer, based on the pre-defined coding criterion (e.g., rate-distortion cost).

An encoder can also use an iterative process of steps 4 and 5 until the filter decision does not change any more for the entire set of pixels in the symmetry group or a subset of pixels in the symmetry group. Alternatively or additionally, an encoder may terminate the iterative process early, for example, after some number N of iterations have been performed, and/or after the value of a pre-defined coding criterion has converged, for example, it does not change by more than a number M %. Further, an encoder may also skip steps 4 and 5 (e.g., not re-compute the adaptive filter), which may reduce encoder complexity.

Using the BAIF scheme of an embodiment, the filter buffer for each pixel position may grow and change independently of each other. As the filter buffer size changes, the number of bits used to send filter_idx also may change. Embodiments may use various ways to encode filter_idx, for example, any of Fixed Length Coding (FLC), Variable Length Coding (VLC), and arithmetic coding may be used.

An embodiment may use a default filter to further reduce the bit cost associated with filter signaling in BAIF. First a set of given filters is designated as the default filters (for example, one default filter for each pixel position). Then, a flag use_default_filter_flag may be signaled to indicate whether certain pixel positions will use the default filter. If use_default_filter_flag is sent for all the pixel positions collectively, then the additional cost of this flag is only 1 bit. Yet, if the default filter for each pixel position is chosen intelligently, this scheme may achieve effective reduction of the prediction error energy at negligible cost. This scheme may be especially useful in certain video sequences, for example, sequences with relatively stationary statistics. The flag use_default_filter_flag may be signaled collectively for all of the pixel positions in all of the symmetry groups or it may also be signaled for each symmetry group separately.

Embodiments may use one or more methods to designate the default filters, as the examples listed below.

1. The encoder and the decoder may agree upon the default filters beforehand, therefore there is no need to signal the default filters. For example, the H.264/AVC filters can be used as the default filters;

2. The default filters may be designated on the sequence level by explicitly signaling them as a part of the sequence level syntax (e.g., the sequence parameter set in H.264/AVC);

3. The default filters may also be designated on the picture level by explicitly signaling them as a part of the picture level syntax (e.g., the picture parameter set in H.264/AVC); or 4. The default filters may also be designated on the slice level as a part of the slice header. This may be done by selecting a sub-set of the default filters already signaled on the sequence and/or picture level to be used for the current slice. For example, if a total of 5 filters, $h_0^X, h_1^X \ldots h_4^X$, are signaled on the sequence and/or picture level for the position X, then it may be signaled as part of the slice header that only $h_0^X$ and $h_4^X$ are used as default filters to code the current slice. This helps to reduce the bit overhead used to code the filter indices in the current slice.

In an embodiment, instead of directly using the adaptive filters stored in the buffer "as is," the filters in the buffer can also be refined. An embodiment may refine buffered filters by sending an additional flag refine_filter_flag after sending the syntax filter_idx (e.g., FIG. 6, FIG. 7). If this flag refine_filter_flag=1, then refinements to the specific filter in the filter buffer will also be sent. The decision as to whether to send filter refinements can be based on a pre-defined coding criterion, such as the Lagrangian rate-distortion cost, either at the picture level or at the slice level.

In an embodiment, a video encoder may perform region analysis and segment the input image into several regions. In this case, the adaptive filters may be derived for each individual region. The encoder may also make filter selection decision for each individual region as well. After filters for each region are sent, the filters may be managed as described below, they may be added to the filter buffer and used to code subsequent regions from the same picture or future pictures.

As used herein, the terms "bitstream unit" may relate to a syntax structure for signaling a filter, such as a network abstraction layer (NAL) unit of a video codec. For instance, the NAL units specified in the MPEG-4 AVC/H.264 standard codec can function as an appropriate syntax structure with which an embodiment of the present invention may be implemented. In an embodiment related to a BAF and/or BAIF scheme, an encoder may send a set of adaptive filters at the beginning or in the middle of coding in a separate bitstream unit, such as a separate NAL unit. A new bitstream unit or a new NAL unit may be referred to as the AIF unit. The AIF unit may be useful with encoders that can perform multiple-pass coding and/or video pre-analysis prior to coding. With such capability, the encoder can analyze a group of video frames, derive the interpolation filters based on statistics of the current group of video frames, and send these filters in the AIF unit, which can then be used during encoding. Thus, when coding the beginning frames in the current group of frames, the encoder already has low-cost access to adaptive filters that are fine tuned for the incoming video signal. The encoder may thus avoid having to gradually build up the adaptive filter buffer while coding is performed. The encoder can also send additional AIF units with new adaptive filters any time during coding. As new filters become available, existing filters in the filter buffer may be replaced to prevent buffer overflow. Embodiments may use various ways to manage the adaptive filter buffers.

An embodiment of the present invention may relate to one or more of the example embodiments, enumerated below.

1. A method, comprising the steps of:
    establishing at least one filter buffer in one or more of a video encoder or a video decoder; and
    buffering one or more filters in the at least one filter buffer; and
    coding an input video signal using the one or more filters in the at least one filter buffer.
2. The method as recited in Enumerated Example Embodiment 1 wherein the one or more buffered filters comprises one or more adaptive filters.
3. The method as recited in Enumerated Example Embodiment 2 wherein the one or more adaptive filters comprises one or more of:
    an adaptive interpolation filter;
    an adaptive in-loop filter; or
    an adaptive post-loop filter.
4. The method as recited in Enumerated Example Embodiment 1 further comprising one or more of the steps of:
    receiving the one or more adaptive filters at the decoder, wherein the one or more adaptive filters comprise a portion of a video bitstream that is received at the decoder; or
    deriving at least one of the one or more adaptive filters at the encoder.
5. The method as recited in Enumerated Example Embodiment 1 wherein the buffer is established in a video encoder, the method further comprising the step of encoding one or more of a picture or a slice.
6. The method as recited in Enumerated Example Embodiment 5 wherein the encoding step comprises:
    filtering one or more components of the picture or slice using the one or more filters;
    and buffering the one or more filters in the at least one filter buffer.
7. The method as recited in Enumerated Example Embodiment 1, further comprising the step of indexing the buffered filters.
8. The method as recited in Enumerated Example Embodiment 7 wherein the buffer is established in the video encoder, the method further comprising:
    signaling the buffered filters index within a video bitstream that is encoded or transmitted with the encoder.
9. The method as recited in Enumerated Example Embodiment 7 wherein the filter index is coded with one or more of fixed length coding, variable length coding, or arithmetic coding.
10. The method as recited in Enumerated Example Embodiment 1 wherein the at least one filter buffer comprises one or more fixed filters.
11. The method as recited in Enumerated Example Embodiment 1 wherein the filter buffer is established at the encoder, further comprising the step of:
    dynamically updating the filter buffer based on one or more of a characteristic or statistics that correspond to a picture or a slice that is encoded with the encoder.
12. The method as recited in Enumerated Example Embodiment 1 wherein the filter buffer is established at the decoder, further comprising the step of:
    dynamically updating the filter buffer based on one or more of a characteristic or statistics that correspond to a picture or a slice that is received in a video bitstream with the decoder.
13. The method as recited in Enumerated Example Embodiment 11 and Enumerated Example Embodiment 12, further comprising the step of:
    synchronizing the encoder and the decoder in relation to the dynamically updating step.
14. The method as recited in Enumerated Example Embodiment 1, wherein the one or more filters in the at least one filter buffer are used to perform one or more of motion interpolation, motion estimation, motion compensation, motion estimation interpolation, motion compensation interpolation, motion prediction interpolation or motion prediction.
15. The method as recited in Enumerated Example Embodiment 14, wherein one or more pixel positions are defined for the motion interpolation, motion estimation, motion compensation, motion estimation interpolation, motion compensation interpolation, motion prediction interpolation and motion prediction processes.
16. The method as recited in Enumerated Example Embodiment 15, wherein one or more filter buffers are established to be associated with the one or more pixel positions.
17. The method as recited in Enumerated Example Embodiment 16, wherein the one or more fixed filters in the at least one filter buffer comprise one or more of:
    a bilinear filter;
    a bi-cubic filter;
    one or more Lanczos filters;
    one or more filters that are used with performing motion interpolation for the one or more pixel positions; or
    one or more filters that are specified within the H.264/AVC MPEG-4 part 10 video standard for performing motion interpolation for the one or more pixel positions; or
    one or more filters that are specified within the H.264/AVC MPEG-4 part 10 video standard for performing motion interpolation for the one or more pixel positions having higher precision independent of intermediate rounding and or clipping.
18. The method as recited in Enumerated Example Embodiment 15 and Enumerated Example Embodiment 16, further comprising the steps of:
    assessing a pixel symmetry associated with the one or more pixel positions; and
    based at least in part on the pixel symmetry assessing step, deriving at least one new adaptive filter; and
    based at least in part on the pixel symmetry assessing step, deciding whether to apply the at least one new adaptive filter or at least one of the one or more buffered filters for at least one pixel of a group of pixels that share the pixel symmetry.
19. The method as recited in Enumerated Example Embodiment 18, wherein at the encoder, the deciding step comprises one or more of the steps of:
    upon deciding that no new adaptive filter is used for the pixel symmetry group:
        signaling that no new adaptive filter is sent in the video bitstream for the pixel symmetry group;
        signaling the index of the buffered filters in the video bitstream for each pixel position in the pixel symmetry group; and
    instructing the decoder to use the buffered filters;
    upon deciding that the at least one new adaptive filter is to be used for the pixel symmetry group:
        signaling that the at least one new adaptive filter is sent in the video bitstream for the pixel symmetry group;
        signaling the coefficients of the at least one new adaptive filter in the video bitstream;
        dynamically updating the filter buffer; and
        instructing the decoder to use the at least one new adaptive filter upon receipt thereof.
20. The method as recited in Enumerated Example Embodiment 19 wherein at the encoder, upon signaling that at least one new adaptive filter is sent in the bitstream for the pixel symmetry group, the method further comprises the steps of:
    for each pixel position in the pixel symmetry group, signaling whether the at least one new adaptive filter is used; and for each pixel position in the pixel symmetry group for which the at least one new adaptive filter is not used, signaling the index of the buffered filters in the video bitstream.

21. The method as recited in Enumerated Example Embodiment 19 and Enumerated Example Embodiment 20 wherein, at the encoder, the step of deciding whether to send the at least one new adaptive filter or to signal the decoder to use one or more of the buffered filters comprises the steps of:

quantizing one or more coefficients of the at least one new adaptive filter of the pixel symmetry group; and for each pixel position in the pixel symmetry group, selecting at least one of the at least one new adaptive filter or one or more of the buffered filters based on a coding criterion.

22. The method as recited in Enumerated Example Embodiment 21 wherein the selecting step, for each pixel position in the pixel symmetry group, comprises the steps of:

comparing a performance expectation associated with the at least one new adaptive filter with the performance expectation associated with one or more of the buffered filters;

evaluating each of the relative performance expectations based, at least in part, on the coding criterion; and selecting the at least one new adaptive filter or one or more of the buffered filters based, at least in part, on the evaluating step.

23. The method as recited in Enumerated Example Embodiment 16 wherein a filter buffer that is associated with a first pixel position changes dynamically, independent of a dynamic change associated with a second filter buffer that is associated with a second pixel position.

24. The method as recited in Enumerated Example Embodiment 23 wherein the first pixel position and the second pixel position belong to the same pixel symmetry group.

25. The method as recited in Enumerated Example Embodiment 14, further comprising the step of designating at least one default filter for each of the at least one filter buffers.

26. The method as recited in one or more of Enumerated Example Embodiment 18 or Enumerated Example Embodiment 25 wherein the method further comprises the step of deciding whether to use the designated default filter based, at least in part, on a coding criterion associated with using the designated default filter or at least a second filter.

27. The method as recited in Enumerated Example Embodiment 26 wherein the decision as to whether to use the designated default filter for each pixel position is made at least one of:

collectively for all of the pixel positions, wherein the decision is signaled collectively for all of the pixel positions to the decoder in the video bitstream;

collectively for all of pixel positions in the same pixel symmetry group and separately for each pixel symmetry group, wherein the decision is signaled collectively for all of the pixel positions in the same pixel symmetry group and separately for each pixel symmetry group to the decoder in the video bitstream; or separately for each pixel position and signaled separately for each pixel position to the decoder in the video bitstream.

28. The method as recited in Enumerated Example Embodiment 18 wherein the deciding step, for each pixel position in the pixel symmetry group, comprises the steps of:

comparing the performance expectation associated with one or more of the new adaptive filter and the buffered filters, with a performance expectation associated with a refinement to at least one characteristic of at least one of the one or more buffered filters;

evaluating each of the relative performance expectations based, at least in part, on a coding criterion;

refining the at least one characteristic of the one or more buffered filters based, at least in part, on the evaluating step; and updating the one or more buffered filters with the refined characteristic.

29. The method as recited in one or more of Enumerated Example Embodiments 21, 22, 26 or 28 wherein the coding criterion comprises a Lagrangian bitrate-versus-image distortion cost estimation.

30. The method as recited in Enumerated Example Embodiment 1, wherein at the encoder, the method further comprises the steps of:

analyzing each region of a video picture; and segmenting the picture into one or more image regions based, at least in part, on the analyzing step.

31. The method as recited in Enumerated Example Embodiment 30 further comprising one or more of:

deriving at least one adaptive filter for each of the one or more segmented image regions; or selecting at least one filter for each of the one or more segmented image regions.

32. The method as recited in Enumerated Example Embodiment 31, further comprising the steps of:

sending the selected at least one filter for each of the one or more segmented image regions in the video bitstream; and buffering the at least one filter for each of the one or more segmented image regions in the at least one filter buffer.

33. The method as recited in Enumerated Example Embodiment 1, further comprising one or more of the steps of:

at the encoder:

deriving at least one adaptive filter for a group of pictures of a video sequence;

buffering the at least one adaptive filter; and sending the at least one adaptive filter in a first bitstream unit prior to or during sending of a second bitstream unit, wherein the at least one adaptive filter is used to encode the group of pictures; or at the decoder:

receiving the one or more adaptive filters in the first bitstream unit at the decoder;

buffering the at least one adaptive filter; and receiving the second bitstream unit, wherein the at least one adaptive filter is used to decode the group of pictures.

34. The method as recited in Enumerated Example Embodiment 33, wherein the first bitstream unit contains at least one adaptive filter derived for the group of pictures, and the second bitstream unit contains coding information for the group of pictures, including at least one filter index that corresponds to the at least one adaptive filter sent in the first bitstream unit.

35. The method as recited in Enumerated Example Embodiment 33, wherein the encoder performs a function that relates to one or more of:

a multiple-pass video encoding function, wherein the at least one adaptive filter in the first bitstream unit is derived during the video encoding function; or a video pre-analysis function that the encoder performs prior to performing the video encoding function, wherein the at least one adaptive filter in the first bitstream unit is derived during the video pre-analysis function.

Example Filter Buffer Management

A BAIF related embodiment efficiently and effectively manages the filter buffers. Various aspects of the filter buffer management may directly impact on the system's coding efficiency. Filter buffer management may include management of filter buffer size, filter placement in a filter buffer, and/or use of default filter buffers.

Example Filter Buffer Size Management

For a given pixel position X (e.g., FIG. 3), the larger its filter buffer is, the more filter choices it has to potentially reduce the prediction error energy. However, a larger filter buffer also increases the signaling overhead, as longer codewords are typically needed to code filter_idx. An embodiment maintains an appropriate filter buffer size, which helps to achieve an acceptable trade-off between distortion reduction and signaling overhead. In an embodiment, for a given pixel position X, several options for managing its filter buffer include:

1. If a new adaptive filter is sent (e.g., new_filter_flag=1) for the corresponding symmetry group to which X belongs, then the new adaptive filter is added to X's filter buffer;

2. If a new adaptive filter is sent (e.g., newIter_flag=1) for the corresponding symmetry group to which X belongs, and if position X uses the new filter (e.g., use_newIter_flag=1), then the new adaptive filter is added to X's filter buffer;

3. If a new adaptive filter is sent (e.g., new_filter_flag=1) for the corresponding symmetry group to which X belongs, then the encoder sends an additional flag, add_new_filter_flag, in the bitstream to indicate whether the new filter should be added to X's filter buffer. In an embodiment, the flag add_new_filter_flag may be sent for the entire symmetry group, it may be sent for each pixel position in the symmetry group, or it may be sent for each pixel position in the symmetry group with use_new_filter_flag=1;

4. The encoder may use certain criterion to decide whether to add a new adaptive filter to the filter buffer. Such a decision may be made based on analyzing certain filter characteristics (e.g., filter frequency response) and deciding whether the new filter is sufficiently different from the existing filters in the buffer. For example, if the new filter is considered "sufficiently different," then it is added to the filter buffer; otherwise, it is not added. The encoder and the decoder use the same criterion to ensure that they stay in sync; or 5. An embodiment may use one or more combinations of the above options. For example, a pre-defined criterion may be used, e.g., as in '4' above, to decide whether the new filter is "sufficiently different." If the criterion exceeds a pre-defined threshold, then the additional flag add_new_filter_flag is signaled, e.g., as in '3' above; otherwise, no additional flag is signaled.

In an embodiment, when the filter buffer for pixel position X is full (or approaches a size capacity), it may be decided whether to replace some existing filters with the new filters, and if so, which existing filters will be replaced. In an embodiment, options for deciding whether to replace some existing filters with the new filters, and if so, which existing filters will be replaced include:

1. A sliding window strategy of first-in-first-out may be used, such that the oldest filter in the filter buffer is removed and the new adaptive filter is added; or 2. A usage-based replacement strategy may be used, such that the least used filter in the filter buffer is removed and replaced by the new filter. The order of the filters in the buffer may be re-arranged; or 3. Additional syntax may be sent in the bitstream to explicitly specify which existing filter in the filter buffer will be removed and replaced by the new filter; or 4. Adaptive switching among the options above may also be used. For example, initially syntax may be sent to indicate that sliding window strategy is used; later further syntax may be sent to indicate that the usage-based strategy will replace the sliding window strategy.

In an embodiment, the maximum size (e.g., capacity) of the filter buffers may be significant. The maximum size capacity of the filter buffers may relate to one or more of: (1) system complexity, for example memory required for filter storage; (2) when and how to replace the existing filters when buffers are full; or (3) the trade-off between distortion reduction and signaling overhead. For some video sequences, a few of the pixel positions may be used more frequently than the remaining pixel positions. For example, a panning scene may have most of its motion corresponding to just a few of the pixel positions. In such a case, the more frequently used pixel positions may benefit from a larger filter buffer. Thus, within a pixel symmetry group, an embodiment allows each pixel position's filter buffer to have different maximum size from that, which corresponds to another pixel position in the pixel symmetry group. In an embodiment, for a given pixel position X, options for how to specify the maximum filter buffer size may include one or more of explicit signaling or implicit deriving.

Explicit signaling comprises the encoder sending additional syntax in the bitstream to indicate whether to change the maximum filter buffer size. If this syntax indicates that the maximum filter buffer size will be changed, the encoder will signal the new maximum filter buffer size, for example, by sending the difference in (e.g., delta) buffer size, and the direction in which the change will occur (e.g., increase buffer size or decrease buffer size). For example, the encoder may send a new AIF slice that contains a number of new adaptive filters to anticipate the change in signal statistics; or the filter buffer size may be increase such that these adaptive filters can be added to the buffers without removing the existing filters. The encoder may also send syntaxes to decrease the filter buffer size at a later time.

Implicit deriving comprises the encoder and the decoder using the same rule or set of rules to derive the maximum buffer size. For example, maximum buffer size for pixel position X may be adjusted upwards if the amount of motion corresponding to position X is high (e.g., above a pre-set threshold).

Example Filter Placement in the Filter Buffer

In an embodiment, the order of the filters in the filter buffer for each pixel position X may affect use of the BAIF scheme. For example, when VLC is used to code filter_idx, a shorter codeword will be assigned to code a smaller filter_idx value. Thus, arranging filters in the filter buffer appropriately may become a significant consideration. In an embodiment, options for arranging the filters in the filter buffer may include one or more of:

1. In an embodiment, the encoder and the decoder may both keep track of a certain criterion, for example, the usage count of each filter in a given filter buffer. The encoder and the decoder then both periodically re-order the filters in the buffer according to this criterion. For example, if usage count is used, more frequently used filters are placed at the beginning of the filter buffer so that filter_idx associated with them have smaller values. Such a re-ordering operation may be performed for every picture/slice, or every N pictures/slices (wherein N comprises a positive integer). In an embodiment, a time-weighted factor may also be added to the usage count of each filter to reflect the distance in time from the last time each filter was used. Time weighting allows the encoder and the decoder to "phase out" the remote filter usage statistics more quickly. In an embodiment, remote filter usage statistics phase out is performed with weighting, before updating the filter buffer and filter usage statistics, the current usage counts down by a certain factor $\eta$, $\eta<1$. An embodiment performs the time-weighting with explicit tracking of the time each filter was last used and applying weights according to those intervals.

2. In an embodiment, the encoder may also send additional syntax in the bitstream to instruct the decoder to re-order the filters in a given buffer. One way is to encode the filter usage statistics as the additional syntax, such that the decoder will re-order the filter buffers according to these statistics. For example, if the encoder detects a scene change, it may send specific usage statistics to the decoder, such that the decoder, after interpreting these usage statistics, will bring the filters more suitable for the new scene up to the front of the buffer, while moving the filters more suitable for the old scene to the back or even removing them.

3. In an embodiment, the options '1' and '2' described above may be combined and used together. For example, the encoder and the decoder may periodically re-order the filters. Additionally (or alternatively), when desired, the encoder may send syntax to instruct the decoder to perform additional re-ordering even if it is not yet time to perform periodic re-ordering.

Example Default Filter Buffer

In an embodiment, for each pixel position X, a default filter may comprise a commonly used fixed filter, such as the H.264/AVC filter. One or more pixel positions (e.g., in a pixel symmetry group) may benefit from having more than one default filter. Thus, an embodiment maintains two buffers for a given pixel position X: a default filter buffer and an adaptive filter buffer. A first filter buffer stores the commonly used default filters, which do change relatively infrequently with respect to the adaptive filters (e.g., similar to the concept of a long-term reference picture buffer, as specified in the H.264/AVC standard). A second filter buffer stores the adaptive filter buffer, which tends to change somewhat more dynamically then the default filters (e.g., similar to the concept of short-term reference picture buffer in the H.264/AVC standard). In an embodiment, the options for indexing into either the default picture buffer or the adaptive filter buffer include one or more of:

1. The two buffers are indexed separately. Thus, in addition to filter_idx, another flag will be sent to identify the filter buffer being used; or 2. The two buffers are indexed jointly. For example, if the default filter buffer contains two filters and the adaptive filter buffer contains three filters, then filter_idx=0,1 will index into the default filter buffer and filter_idx=2,3,4 will index into the adaptive filter buffer. Alternatively (or additionally), filter_idx=0,1,2 will index into the adaptive filter buffer and filter_idx=3,4 will index into the default filter buffer.

An embodiment of the present invention may relate to one or more of the example embodiments, enumerated below.

36. The method as recited in Enumerated Example Embodiment 1, further comprising the step of:
managing the at least one filter buffer.

37. The method as recited in Enumerated Example Embodiment 36, wherein the managing step comprises one or more of the steps of:
upon an encoder sending and a decoder receiving a new adaptive filter, adding the new adaptive filter to the filter buffer with which the new adaptive filter is associated;
upon the sending and receiving a new adaptive filter and the encoder and the decoder deciding in synchronization that one or more conditions are met, adding the new adaptive filter to the filter buffer with which the new adaptive filter is associated; or
upon sending and receiving a new adaptive filter, the encoder sending and the decoder receiving additional syntax in the video bitstream, wherein the syntax indicates whether the new adaptive filter is to be added to the filter buffer with which the new adaptive filter is associated, and
upon the additional syntax having a first of at least two values, adding the new adaptive filter to the filter buffer with which the new adaptive filter is associated based, at least in part, on the first value of the additional syntax; or
upon the additional syntax having a second of the at least two values, maintaining a state of the filter buffer that is free of the new adaptive filter based, at least in part, on the second value of the additional syntax.

38. The method as recited in Enumerated Example Embodiment 37 wherein the additional syntax signal relating to whether to add the new adaptive filter is sent for at least one of:
a pixel symmetry group as a whole; or
each pixel position in the pixel symmetry group.

39. The method as recited in Enumerated Example Embodiment 37, further comprising the step of deciding whether to add a new adaptive filter to the filter buffer with which it is associated.

40. The method as recited in Enumerated Example Embodiment 39, wherein deciding whether to add a new adaptive filter to the filter buffer with which it is associated comprises the step of deciding if the new adaptive filter is used to code the current picture or slice.

41. The method as recited in Enumerated Example Embodiment 39, wherein deciding whether to add a new adaptive filter to the filter buffer with which it is associated comprises the steps of:
analyzing at least one characteristic of the new adaptive filter;
comparing the at least one characteristic of the new adaptive filter with at least one characteristic of a buffered filter; and
upon the compared characteristics of the new adaptive filter and the buffered filters differing to a degree more than specified according to one or more filter distinction criteria, adding the new adaptive filter to the filter buffer; or
upon the compared characteristics of the new adaptive filter and the buffered filters differing to a degree less than specified according to one or more filter distinction criteria, refraining from adding the new adaptive filter to the filter buffer.

42. The method as recited in Enumerated Example Embodiment 41 wherein the filter distinction criteria of the encoder and the filter distinction criteria of the decoder are substantially similar.

43. The method as recited in Enumerated Example Embodiment 41 wherein the filter distinction criteria comprise one or more of:
a filter frequency response;
a filter impulse response; or
a pre-defined threshold relating to a distinctiveness between at least two filters.

44. The method as recited in Enumerated Example Embodiment 36, wherein the managing step comprises the step of:
determining a capacity state of the filter buffer; and
upon determining that the filter buffer is near full capacity, deciding whether to replace one or more buffered filters with one or more new filters; and
upon deciding to replace one or more buffered filters with one or more new filters, further deciding which of the buffered filters is to be replaced with the one or more new filters.

45. The method as recited in Enumerated Example Embodiment 44 wherein deciding which of the buffered filters is to be replaced with the one or more new filters comprises one or more of the steps:
a) replacing a buffered filter that has been buffered longer than other filters in the buffer with a new filter;

b) replacing a buffered filter that is used less than other filters in the buffer with a new filter;

c) replacing a buffered filter that is specified to be replaced by a signal or syntax in the video bitstream; or d) adaptively switching among the steps a)- through -c).

46. The method as recited in Enumerated Example Embodiment 36, further comprising the step of specifying a capacity size of each filter buffer.

47. The method as recited in Enumerated Example Embodiment 46 wherein the capacity size of a first of the filter buffers is independent of the capacity size of a second of the filter buffers.

48. The method as recited in Enumerated Example Embodiment 46 wherein the specifying step further comprises the steps of:

at the encoder, explicitly signaling a change in the filter buffer capacity size; or at one or more of the encoder or the decoder, implicitly deriving the filter buffer capacity size according to at least one essentially identical rule.

49. The method as recited in Enumerated Example Embodiment 36, wherein the managing step comprises the step of arranging an order with which the filters are buffered in the at least one filter buffer.

50. The method as recited in Enumerated Example Embodiment 49, wherein the arranging step comprises the steps of:

tracking at least one filter arrangement criterion at the encoder;

tracking the at least one filter arrangement criterion at the decoder; and reordering the filters in the encoder filter buffer and the decoder filter buffer according to the at least one filter arrangement criterion.

51. The method as recited in Enumerated Example Embodiment 49, wherein the arranging step comprises the steps of:

at the encoder, signaling syntax in the video bitstream that instructs the decoder to reorder the filters in one or more of the filter buffers; and reordering the filters in the decoder filter buffer based, at least in part, on the signaled syntax.

52. The method as recited in Enumerated Example Embodiment 49, wherein the arranging step comprises the steps of:

computing one or more usage statistics that relate to the buffered filters; and reordering the filters in one or more of the filter buffers based, at least in part, on the computed filter usage statistics.

53. The method as recited in Enumerated Example Embodiment 52, wherein the computing step comprises the steps of:

tracking a time weighting factor; and weighing the usage statistic based, at least in part, on the time weighting factor.

54. The method as recited in one or more of Enumerated Example Embodiments 50, 51, 52 or 53 wherein the arranging step comprises a combination of two or more of the steps recited therein.

55. The method as recited in Enumerated Example Embodiment 36, further comprising the step of designating at least one default filter.

56. The method as recited in Enumerated Example Embodiment 55 wherein the step of designating at least one default filter comprises one or more of the steps of:

the encoder and the decoder agreeing upon the at least one default filter prior to the coding step;

designating the at least one default filter on a sequence level wherein the at least one default filter is signaled as a part of the sequence level syntax;

designating the at least one default filter on a picture level wherein the at least one default filter is signaled as a part of the picture level syntax; or designating the at least one default filter on a slice level wherein the at least one default filter is signaled as a part of the slice header.

57. The method as recited in Enumerated Example Embodiment 55, further comprising the steps of:

indexing at least one default filter and at least one other filter, wherein the at least one default filter and the at least one other filter are indexed jointly or separately.

Example Signaling of Adaptive Filters for Multiple Reference Pictures

Among other reasons, AIF schemes may offer significant coding gain because they can specify a unique, e.g., "tailor-made," motion prediction relationship between a current frame and a reference picture from which the current frame is coded. For instance, each given adaptive filter essentially dictates a relationship between two picture or slices, e.g., the current picture/slice being coded, and the reference picture from which it is predicted. While conventional AIF schemes signal the adaptive filters for each pixel position (or each symmetry group) but share the adaptive filters among all reference pictures, an embodiment of the present invention signals adaptive filters for each reference picture separately, when multiple reference pictures are used to code the current picture/slice.

Thus, a BAF and/or BAIF scheme according to an embodiment of the present invention allows the adaptive filters to be specified for each reference picture separately. Specifying adaptive filters for each reference picture separately allows a more accurate motion prediction relationship between a current picture/slice and each of its reference pictures. As used herein, the terms "accurize," "accurized," and "accurizing" may relate to increasing an accuracy, e.g., associated with a motion prediction. As used herein, the terms "offset" and "offsetting" may respectively relate to the terms "compensate" or "compensated" and "compensating for," e.g., a bit cost, computation, processing or memory cost or bandwidth cost, etc. In an embodiment, encoding a current picture and/or slice with multiple reference pictures includes accurizing a motion prediction relationship between the current picture/slice and each of the multiple reference pictures. The embodiment thus offsets a bit cost, which may be associated with separately signaling the adaptive filters for at least a subsequent (e.g., second) of the multiple reference pictures, with a reduction in an error energy that is associated with the accurized motion prediction relationship. Thus, although signaling adaptive filters for each reference picture separately may incur some additional bit overhead, the signaling schemes of an embodiment help to keep the additional bit cost substantially low. Moreover, the essentially small additional bit cost may often be out-weighed by a significantly larger reduction in prediction error energy.

Figure 8:
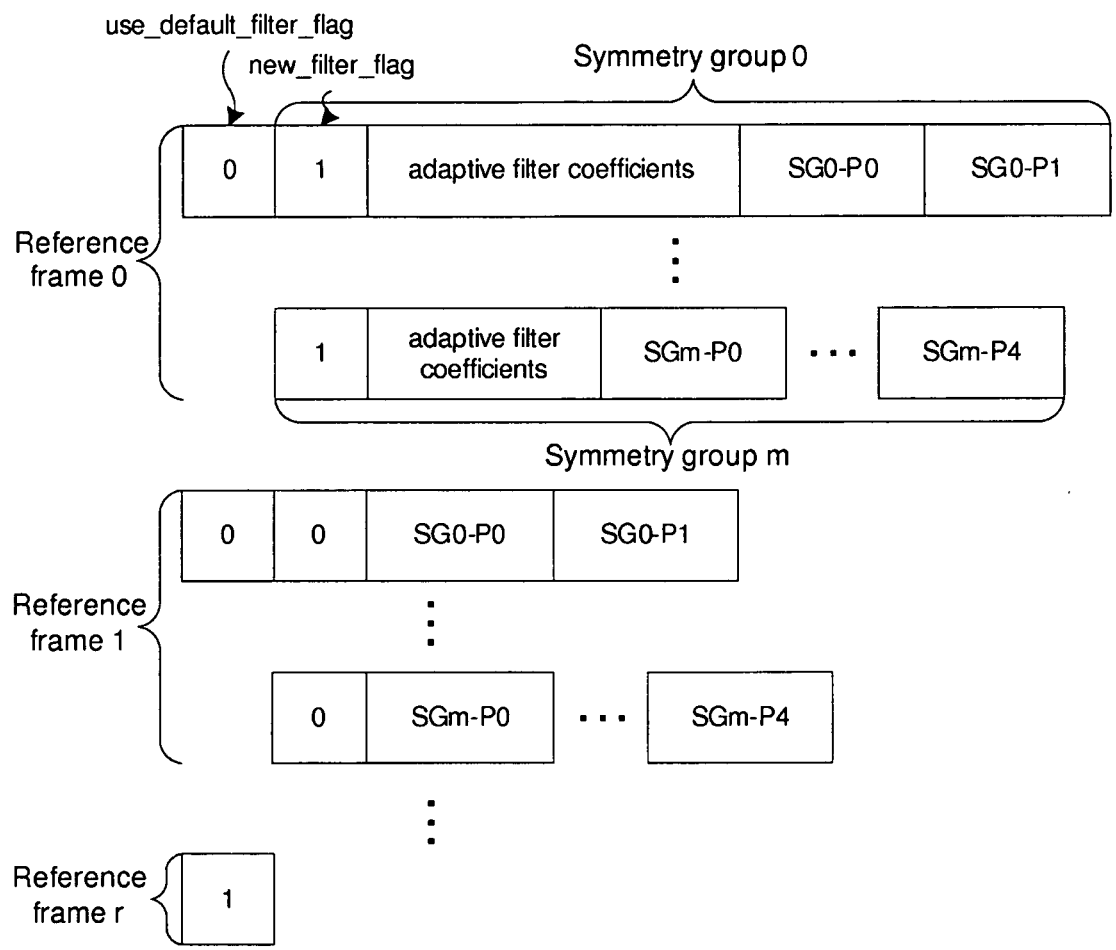
FIG. 8 depicts an example of signaling adaptive filters for each reference picture separately, according to an embodiment of the present invention.

FIG. 8 depicts an example of signaling adaptive filters for each reference picture separately, according to an embodiment of the present invention. For reference picture 0 (which may typically comprise the most commonly used reference), more bits are used to specify more accurate adaptive filters. For reference picture 1 however, fewer bits are spent in an embodiment, because substantially all of its pixel positions use existing filters, buffered in the filter buffer. For the last reference picture in a video sequence, as few as 1 bit may be sent, e.g., to signal that all pixel positions are to use the default filter.

An embodiment exploits correlation between different reference pictures and a current picture being coded, which may also improve coding performance. In an embodiment, instead of using a filter in the buffer "as is," an alternative (or addition) is to refine the filter. Filter refinement may comprise (1) using an existing filter in the filter buffer as a prediction, and (2) sending one or more differential filter coefficients. When multiple reference pictures are used, an embodiment performs certain image analysis techniques to determine (e.g., ascertain, understand, etc.) similarities that may exist between the multiple reference pictures and the current picture, as well as among the multiple reference pictures. For example, image analysis may reveal that a reference picture A and a reference picture B are similar to each other in one or more ways. Thus, after interpolation filters for reference picture A have been derived and signaled, an embodiment may derive and signal the interpolation filters for reference picture B with refining of the corresponding filters for reference picture A.

Example Adaptive Filter Buffers for Bi-Prediction and Reference Picture Re-Ordering A number of video coding systems allow the use of bi-prediction, wherein the prediction signal is formed by combining two prediction signals from two reference pictures. Bi-prediction is a commonly used form of multi-hypothesis prediction, wherein a prediction is formed by combining two (2) or more prediction signals together. In a BAIF related embodiment, the two reference pictures may be associated with different interpolation filters. Further, some systems (e.g., the H.264/AVC video coding standard) allow the same reference picture to appear in both prediction lists. In this case, the reference picture may be associated with one set of filters when it appears in one prediction list (List0), and be associated with another set of filters when it appears in the prediction list (List1). An embodiment extends this multiplicity of filter associations to the case of multi-hypothesis prediction.

Some video coding systems (e.g., H.264/AVC) allow reference picture re-ordering, wherein one reference picture may appear in the same prediction list more than once and be assigned different reference picture indices. An BAIF related embodiment allows different sets of adaptive filters to be associated with the same reference picture when it appears in the prediction list more than once and is assigned different reference indices, which can promote flexibility, and thus coding performance. For example, where a given reference picture appears in prediction list List0 twice and is assigned reference indices with values ref_idx_A and ref_idx_B, a BAIF related embodiment allows adaptive filter set A to be associated with ref_idx_A and filter set B to be associated with ref_idx_B, wherein filter set A and filter set B may contain some filters that are the same and some filters that are different. This approach may be useful where the reference picture labeled ref_idx_A is used without weighted prediction and the reference picture labeled ref_idx_B is used with weighted prediction. In such a scenario, a BAIF related embodiment allows adaptive filter set A to be associated with ref_idx_A and filter set B to be associated with ref_idx_B, wherein filter set A and filter set B may contain some filters that are the same but other filters that are different.

In an embodiment, a set of filter buffers may be established and maintained for each reference picture in each prediction list. As coding proceeds, the filter buffers associated with each reference picture may be updated as the reference picture is used to encode the current picture, and a set of interpolation filters are derived for it and sent in the bitstream. As mentioned above, if a reference picture is assigned more than one reference picture index through reference picture reordering, then different sets of filter buffers may be maintained for each instance of reference picture index assignment. Such a set of filter buffers associated with a given reference picture in a given prediction list may be considered "local" buffers. These local buffers may only be "activated" when the given reference picture is used to predict the current picture. Only when the local buffers are activated may the filters in the buffers be used during motion prediction and motion interpolation. Further, only when the local buffers are activated may these local buffers be updated according to the filter management principles mentioned above. In contrast, the set of filter buffers which are not associated with a given reference picture may be considered "global" buffers. The global buffers are always active. The local filter buffers may be used in place of or in combination with the global buffers. In an embodiment, if default filter buffers, such as described above (e.g., in the two paragraphs immediately preceding the enumerated example embodiments) are maintained separately, then default filter buffers may be present in the local filter buffers, as well as in the global filter buffers. Each of these default filter buffers (local ones and global ones) may be updated according to the default filter buffer management principles as mentioned above.

Figure 9:
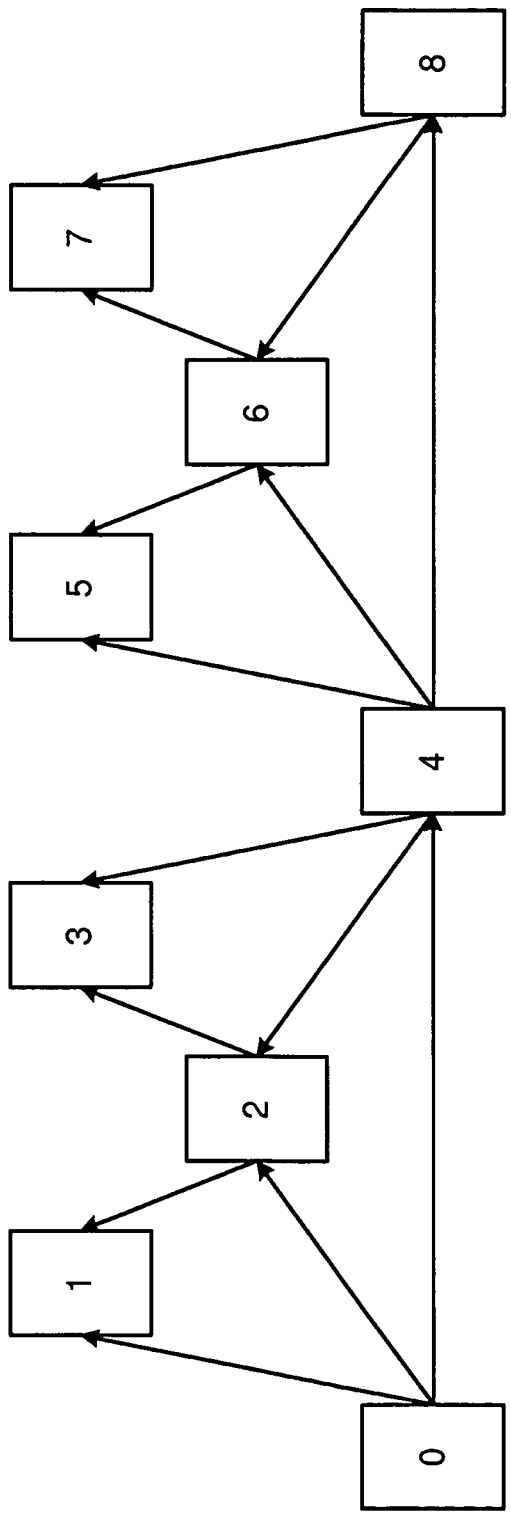
FIG. 9 depicts simple example of hierarchical B prediction, according to an embodiment of the present invention.

Some video coding systems allow the use of hierarchal B prediction structure, wherein a bi-predicted picture (B picture) may be used as reference to code future pictures. FIG. 9 depicts simple example of hierarchical B prediction, according to an embodiment of the present invention. The bottom-level pictures are P pictures using only one prediction list. The middle level pictures are bi-predicted B pictures which are further used as reference pictures. The top level pictures are bi-predicted B pictures which use the bottom-level P pictures and the middle-level B pictures as references but are not used as reference pictures for coding of other pictures. Note that FIG. 9 merely depicts a simple example. A number of other reference picture arrangements, such as using multiple reference pictures from different hierarchical levels, or placing the same reference picture in different hierarchy levels are also commonly used to maximize coding performance. In an embodiment, the establishment and maintenance of filter buffers may be associated not only with a given reference picture with a given reference index, but also with the hierarchy level it resides in. Such a more flexible filter buffer association scheme is achieved in an embodiment with assigning more than one set of filter buffers to a given reference picture with a given reference index.

Example Adaptive Filter Buffer for Multiple Slices

Some video coding systems allow a picture to be coded using multiple slices. Because different slices can be decoded independent of each other, use of multiple slices offers not only improved error resilience, but also the ability to decode the various slices of the same picture in parallel at the same time, thereby offering significant decoding speed advantages. When adaptive filter buffers are used, in order to maintain the ability to parallelize slice decoding, temporary filter buffers may be used for each slice individually during parallel decoding of the slices. Then, after all of the slices for the current picture are decoded, the temporary filter buffers are consolidated to form the final filter buffers, for use of decoding future pictures and slices.

Figure 10:
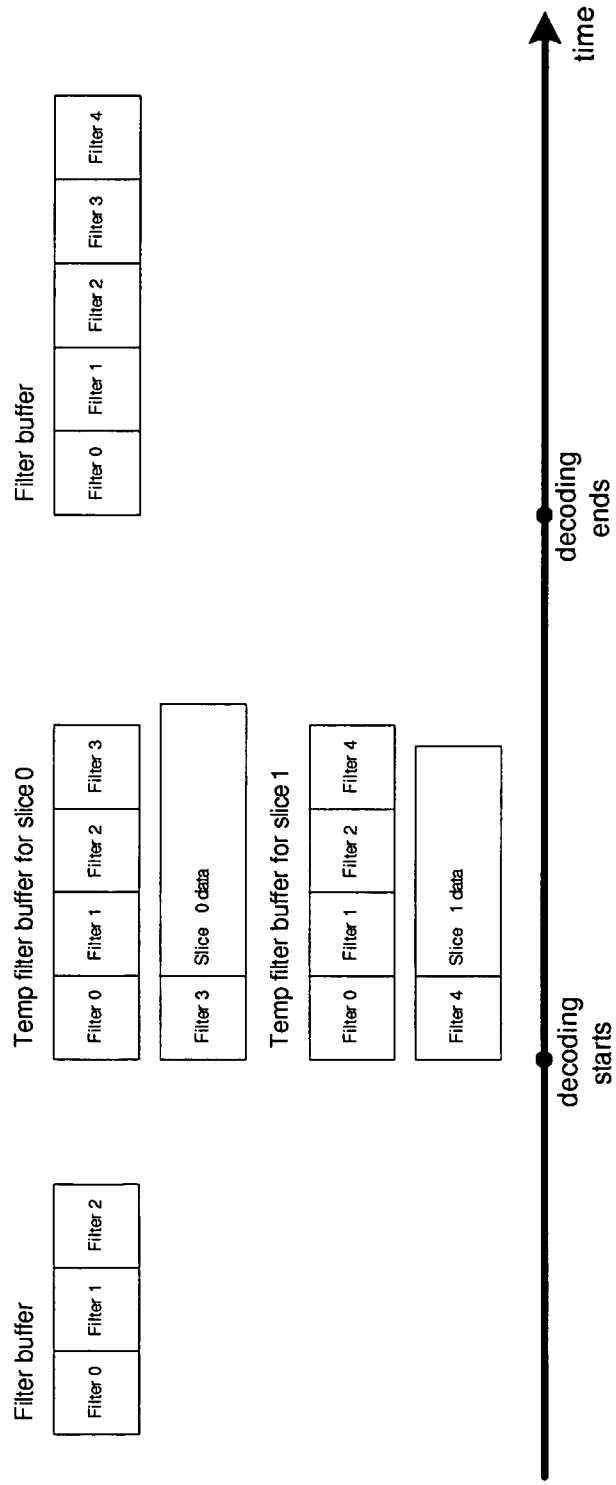
FIG. 10 depicts an example of applying filter buffers to multiple slice decoding, according to an embodiment of the present invention.

FIG. 10 depicts an example of applying filter buffers to multiple slice decoding, according to an embodiment of the present invention. In the example depicted in FIG. 10, prior to decoding of the current slice 0 and slice 1, a filter buffer contains filters 0, 1, and 2. Then, a new adaptive filter 3 is received in slice 0, placed in temporary filter buffer for slice 0 and used to decode slice 0. In parallel, a new adaptive filter 4 is received in slice 1, placed in temporary filter buffer for slice 1 and used to decode slice 1. After decoding of both slices is finished, the final filter buffer may be updated with both filter 3 and filter 4 (as shown in FIG. 10), either filter 3 or filter 4, or neither filter 3 nor filter 4. The final consolidation of the various temporary filter buffers may be performed according to explicitly signaled syntax elements in the bitstream, or according to a set of implicit rules that are followed in the same way at the encoder and at the decoder. For example, the encoder may perform region analysis on a number of future pictures and decide to only include a subset of the new filters that are useful for coding the future pictures. The remaining new filters stored in the temporary filter buffers may not be included in the final filter buffers. Such decisions may be signaled by the encoder explicitly. Other filter buffer management principles as mentioned above, including the temporal weighting mechanism to rearrange filters in the filter buffers, may also be applied during consolidation of the final filter buffers.

Adaptive filters, wherein filter coefficients are derived based on statistics associated with an input video signal and sent as a part of the video bitstream, have been used in block-based and quad-tree based adaptive loop filter schemes, and the post loop filter scheme. An embodiment may relate to an adaptive filter scheme as described in one or more of the following references, which are incorporated herein by reference for all purposes as if fully set forth herein, and which filed herewith as appendices:

(1) A. M. Tourapis, J. Boyce, "Dynamic reference generation for advanced video coding," VCEG-W05, Redmond, Wash., July, 2004;

(2) T. Chujoh, G. Yasuda, N. Wada, T. Watanabe, T. Yamakage, "Improvement of Block-based Adaptive Loop Filter," VCEG-AJ13, San Diego, Calif., October, 2008;

(3) T. Chujoh, T. Yamakage, G. Yasuda, "Improvement of Quadtree-based Adaptive Loop Filter," ITU-T/SG16/Q.6 document C.324, Geneva, Switzerland, October 2009; and (4) M. Karczewicz, G. Motta, Y. Ye, and P. Chen, "Post filter with reduced delay requirement," ITU-T/SG16/Q.6 document C.128, Geneva, Switzerland, January 2009. Embodiments of the present invention, which relate to establishing and managing filter buffers for storing and using adaptive interpolation filters (including use of multiple reference pictures), may be applied directly (e.g., with minimal modifications and straightforward extensions, as applicable) to the adaptive loop filter and post-filter schemes. Moreover, a BAF and/or BAIF related embodiment may be applied with other adaptive filter uses.

An embodiment of the present invention may relate to one or more of the example embodiments, enumerated below.

58. The method as recited in Enumerated Example Embodiment 14 further comprising one or more of the steps of:
encoding one or more of a current picture or slice with at least two (2) reference pictures; or
decoding one or more of a current picture or slice with at least two (2) reference pictures;
wherein one or more adaptive filters for a first of the at least two reference pictures are signaled independently from at least one adaptive filter for at least a second of the at least two reference pictures.

59. The method as recited in Enumerated Example Embodiment 58 wherein the step of encoding one or more of a current picture or slice with at least two (2) reference pictures comprises the steps of:
signaling the one or more adaptive filters for the first of the at least two reference pictures; and
separately signaling the at least one adaptive filter for at least the second of the at least two reference pictures.

60. The method as recited in Enumerated Example Embodiment 59 wherein the step of encoding one or more of a current picture or slice with at least two (2) reference pictures comprises the steps of:
accurizing a motion prediction relationship between the current picture or slice and each of the at least two (2) reference pictures; and
offsetting a bit cost, which is associated with the step of separately signaling the at least one adaptive filter for at least the second of the at least two reference pictures, with a reduction in an error energy that is associated with the accurized motion prediction relationship.

61. The method as recited in Enumerated Example Embodiment 58 wherein one or more of the encoding or decoding steps comprises bi-prediction.

62. The method as recited in Enumerated Example Embodiment 58 wherein the encoding step comprises
multi-hypothesis prediction wherein the prediction is formed as a combination of at least three prediction signals.

63. The method as recited in Enumerated Example Embodiment 58 wherein one or more of the encoding step or the decoding step comprises the step of refining one or more adaptive filters.

64. The method as recited in Enumerated Example Embodiment 63 wherein the step of refining one or more adaptive filters comprises the steps of:
establishing a correlation between a first reference picture and a second reference picture; and
refining one or more adaptive filters of the second reference picture based on one or more adaptive filters of the first reference picture based, at least in part, on the correlation established between the first reference picture and the second reference picture.

65. The method as recited in Enumerated Example Embodiment 63 wherein the refining step comprises the steps of:
predicting an adaptive filter of the second reference picture using at least one filter of the first reference picture; and
sending one or more coefficients, which differentiate between the at least one filter of the first reference picture and the predicted adaptive filter of the second reference picture.

66. The method as recited in Enumerated Example Embodiment 65 wherein the predicting an adaptive filter step comprises the steps of:
analyzing an image portion that corresponds to the first reference picture and an image portion that corresponds to the second reference picture;
determining one or more similarities between one or more of:
the first reference picture and the second reference; or
one or more of the first reference picture and the second reference picture and the current picture or slice; and
selecting the one or more differential filter coefficients based, at least in part, on the determined one or more similarities.

67. The method as recited in Enumerated Example Embodiment 65, wherein:
the first reference picture is associated with one or more first filter characteristics; and
the second reference picture is associated with one or more second filter characteristics.

68. The method as recited in Enumerated Example Embodiment 67, wherein at least one of the one or more second filter characteristics differs from at least one of the one or more first filter characteristics.

69. The method as recited in Enumerated Example Embodiment 58, further comprising the steps of:
re-ordering at least one of the reference pictures; and
assigning the at least one reference picture to each of at least two independent reference picture indices.

70. The method as recited in Enumerated Example Embodiment 69 further comprising the step of:
based at least in part on the step of assigning the at least one reference picture to each of at least two independent reference picture indices, associating two or more sets of adaptive filters with the at least one reference picture.

71. The method as recited in Enumerated Example Embodiment 70 wherein at least one
characteristic of at least
one adaptive filter in a first of the two or more sets of adaptive filters differs from at least one characteristic of at least one adaptive filter in at least a second of the two or more sets of adaptive filters.

72. The method as recited in Enumerated Example Embodiment 70, wherein:
at least a first characteristic of at least one adaptive filter in the first of the two or more sets of adaptive filters differs from at least a first characteristic of at least one adaptive filter in at least a second of the two or more sets of adaptive filters; and
at least a second characteristic of the at least one adaptive filter in the first of the two or more sets of adaptive filters comprises a characteristic that corresponds to or is in common with at least a second characteristic of the at least one adaptive filter in the second of the two or more sets of adaptive filters.

73. The method as recited in Enumerated Example Embodiment 69:
wherein, upon assigning the at least one reference picture to a first index, a prediction based on the at least one reference picture associated with the first index is computed with a weighting factor; and
wherein, upon assigning the at least one reference picture to a second index, a prediction based on the at least one reference picture associated with the second index is computed independent of the weighting factor.

74. The method as recited in Enumerated Example Embodiment 73 wherein, upon
assigning the at least one
reference picture to the second index, the prediction based on the at least reference picture associated with the second index is computed without a weighting factor.

75. The method as recited in Enumerated Example Embodiment 58 wherein at least two (2) of the at least two (2) reference pictures represent one (1) reference picture that is associated with two (2) distinct reference picture index assignments through the use of reference picture re-ordering.

76. The method as recited in Enumerated Example Embodiment 1, wherein at least one of the at least one filter buffer is established for at least one reference picture stored in a reference picture buffer.

77. The method as recited in Enumerated Example Embodiment 76, wherein the at least one filter buffer established for the at least one reference picture is activated when the at least one reference picture is used to code the current picture or slice.

78. The method as recited in Enumerated Example Embodiment 77, wherein activation of the at least one filter buffer comprises one or more of:
indexing into the at least one filter buffer to use one or more buffered filters stored in it; or
updating the at least one filter buffer with one or more adaptive filters derived for the at least one reference picture at the encoder or received in the video bitstream for the at least one reference picture at the decoder.

79. The method as recited in one or more of Enumerated Example Embodiments 76-78, further comprising the step of managing the at least one filter buffer according to one or more of Enumerated Example Embodiments 36-57.

80. The method as recited in Enumerated Example Embodiment 1 wherein coding of the input video signal comprises the step of coding one input picture using at least two (2) slices.

81. The method as recited in Enumerated Example Embodiment 80 wherein decoding of a first slice of the at least two (2) slices is performed in parallel with decoding of a second slice of the at least two (2) slices.

82. The method as recited in Enumerated Example Embodiment 80 wherein a first temporary filter buffer is maintained for decoding of the first slice independently from a second temporary filter buffer maintained for decoding of the second slice.

83. The method as recited in 82, further comprising the step of consolidating one or more temporary buffers wherein the first temporary filter buffer and the second temporary filter buffer are used during the consolidation of temporary buffers step.

84. The method as recited in Enumerated Example Embodiment 83, further comprising forming a final filter buffer based, at least in part, on the consolidating step.

85. The method as recited in Enumerated Example Embodiment 84 wherein the consolidation step used to form the final filter buffer is performed upon completing decoding of the at least two (2) slices of the current picture.

86. The method as recited in Enumerated Example Embodiment 1 wherein one or more of the adaptive filters have a filter characteristic that is derived based, at least in part, on statistics that correspond to the input video signal, and which are sent with the video bitstream.

87. The method as recited in Enumerated Example Embodiment 1 wherein one or more of the adaptive filters comprise at least one of:
an adaptive interpolation filter;
an adaptive loop filter; or
an adaptive post-loop filter.

88. The method as recited in Enumerated Example Embodiment 88 wherein one or more of the adaptive loop filters comprise at least one of:
a block-based adaptive loop filter; or
a quad-tree based adaptive loop filter.

89. The method as recited in one or more of Enumerated Example Embodiment 87 or Enumerated Example Embodiment 88 wherein the buffering step further comprises the steps of buffering one or more of:
one or more of the adaptive loop filters;
one or more of the adaptive post-loop filters;
one or more block-based adaptive loop filters; or
one or more quad-tree based adaptive loop filters.

Implementations of Example Embodiments

An embodiment of the present invention may be implemented with one or more computer systems (or uses thereof), any of a variety of video related apparatus including encoders and/or decoders, and one or more integrated circuit (IC) devices including (but not limited to) a programmable logic device (PLD), a field programmable gate arrays (FPGA), an application specific IC (ASIC), a digital signal processor (DSP) and/or a microcontroller. Moreover, an embodiment of the present invention may be implemented with hardware, software, firmware and/or combinations thereof, including as a software product. An embodiment of the present invention may be performed by one or more processors executing encoded instructions and/or performing a process under the control, programming, configuration or causation of such instructions, which may be stored with one or more computer readable storage media. An embodiment of the present invention may relate to one or more of the example embodiments, enumerated below.

90. A system, comprising:
    means for establishing at least one buffer in one or more of a video encoder or a video decoder;
    means for buffering one or more adaptive filters in the at least one buffer and
    means for coding an input video signal using the one or more filters in the at least one filter buffer.

91. The system as recited in Enumerated Example Embodiment 90, further comprising:
    means for performing or execution a step as recited in one or more of Enumerated Example Embodiments 2-89.

92. The system as recited in Enumerated Example Embodiment 90 wherein the one or more of the adaptive filters comprise at least one of:
    an adaptive interpolation filter;
    an adaptive loop filter; or
    an adaptive post-loop filter.

93. A video encoder, comprising:
    at least one filter buffer that buffers one or more adaptive filters.

94. The video encoder as recited in Enumerated Example Embodiment 93, further comprising:
    at least one processor; and
    a computer readable storage medium comprising instructions, which when executed with the at least one processor, cause or control the video encoder to perform or execute a step as recited in one or more of Enumerated Example Embodiments 2-89.

95. The video encoder as recited in Enumerated Example Embodiment 93 wherein the one or more of the adaptive filters comprise at least one of:
    an adaptive interpolation filter;
    an adaptive loop filter; or
    an adaptive post-loop filter.

96. A video decoder, comprising:
    at least one filter buffer that buffers one or more adaptive filters.

97. The video decoder as recited in Enumerated Example Embodiment 96, further comprising:
    at least one processor; and
    a computer readable storage medium comprising instructions, which when executed with the at least one processor, cause or control the video decoder to perform or execute a step as recited in one or more of Enumerated Example Embodiments 2-89.

98. An apparatus for performing at least one of encoding or decoding a video signal, comprising:
    at least one filter buffer that buffers one or more adaptive filters.

99. The apparatus as recited in Enumerated Example Embodiment 98, further comprising:
    at least one processor; and
    a computer readable storage medium comprising instructions, which when executed with the at least one processor, cause or control the video encoder to perform or execute a step as recited in one or more of Enumerated Example Embodiments 2-89.

100. The apparatus as recited in Enumerated Example Embodiment 98 wherein the one or more of the adaptive filters comprise at least one of:
    an adaptive interpolation filter;
    an adaptive loop filter; or
    an adaptive post-loop filter.

101. A use for a computer system, comprising:
    establishing at least one filter buffer in one or more of a video encoder or a video decoder;
    buffering one or more adaptive filters in the at least one filter buffer; and
    coding an input video signal using the one or more filters in the at least one filter buffer.

102. The use for the computer system as recited in Enumerated Example Embodiment 101, further comprising:
    a step as recited in one or more of Enumerated Example Embodiments 2-89.

103. A use for a computer system, comprising one or more of:
    configuring, programming or controlling one or more of a computer system, a video encoder, a video decoder or an apparatus as recited in one or more of Enumerated Example Embodiments 90-100.

104. A use for a computer system as recited in one or more of Enumerated Example Embodiments 101, 102 or 103 wherein the one or more of the adaptive filters comprise at least one of:
    an adaptive interpolation filter;
    an adaptive loop filter; or
    an adaptive post-loop filter.

105. A computer readable storage medium comprising instructions, which when executed with a processor of one or more of a computer system, a video encoder, or a video decoder, cause, program, configure or control the processor to perform a process, the process comprising:
    establishing at least one filter buffer in one or more Of a video encoder or a video decoder;
    buffering one or more adaptive filters in the at least one filter buffer; and
    coding an input video signal using the one or more filters in the at least one filter buffer.

106. The computer readable storage medium as recited in Enumerated Example Embodiment 105, further comprising instructions, which when executed with a processor of one or more of a computer system, a video encoder, or a video decoder, cause or control the processor to perform a process, the process comprising:
    a step as recited in one or more of Enumerated Example Embodiments 2-89.

107. A computer readable storage medium comprising instructions, which when executed with a processor, configure, program or control one or more of a computer system, a video encoder, a video decoder, an apparatus or a use for a computer system as recited in one or more of Enumerated Example Embodiments 90-104.

108. The computer readable storage medium as recited in one or more of Enumerated Example Embodiments 105, 106 or 107 wherein the one or more of the adaptive filters comprise at least one of:
    an adaptive interpolation filter;
    an adaptive loop filter; or
    an adaptive post-loop filter.

Equivalents, Extensions, Alternatives and Miscellaneous

Example embodiments of buffered adaptive filters are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for encoding or decoding a current picture or slice of a video signal, the method comprising the steps of:
  establishing at least one filter buffer in one or more of a video encoder or a video decoder;
  buffering a plurality of adaptive filters in the at least one filter buffer, wherein the plurality of adaptive filters are used to perform one or more of motion interpolation, motion estimation, motion compensation, motion estimation interpolation, motion compensation interpolation, motion prediction interpolation or motion prediction of an encoding or decoding step;
  encoding or decoding the current picture or slice with at least two (2) reference pictures, wherein one or more of the adaptive filters for a first of the at least two reference pictures are signaled independently from at least one of the adaptive filters for at least a second of the at least two reference pictures; and
  based on the encoding or decoding of the current picture or slice, tracking a usage count of each filter of the plurality of filters; and
  based on the tracking, managing the at least one filter buffer, wherein the managing step comprises the step of:
    arranging an order with which the plurality of adaptive filters are buffered in the at least one filter buffer wherein the order is arranged according to the usage count of each filter in the at least one filter buffer, and by sending an ordering syntax in a video bitstream from the encoder to the decoder, and by periodically re-ordering the plurality of adaptive filters in the at least one filter buffer dependent upon the usage count of each filter in the at least one filter buffer and upon the ordering syntax.

2. The method as recited in claim 1 further comprising the steps of:
  receiving the one or more adaptive filters at the decoder, wherein the one or more adaptive filters comprise a portion of a video bitstream that is received at the decoder; and
  deriving at least one of the one or more adaptive filters at the encoder.

3. The method as recited in claims 2, wherein the one or more of the adaptive filters comprise at least one of:
  an adaptive interpolation filter;
  an adaptive loop filter; or
  an adaptive post-loop filter.

4. The method as recited in claim 1 wherein the buffer is established in a video encoder, the method further comprising the step of encoding one or more additional picture or slice.

5. The method as recited in claim 1, further comprising the step of indexing the buffered plurality of adaptive filters.

6. The method as recited in claim 1, further comprising:
  based on the encoding of the current picture or slice, dynamically updating the filter buffer at the encoder based on one or more of a characteristic or statistics of the current picture or slice;
  based on the decoding of the current picture or slice, dynamically updating the filter buffer at the decoder based on one or more of a characteristic or statistics of the current picture or slice; and
  based on the dynamically updating the filter buffer at the encoder or the decoder, synchronizing the encoder and the decoder in relation to one or more of the dynamically updating steps,
  wherein the dynamically updating comprises adding one or more adaptive filters to the at least one filter buffer.

7. The method as recited in claim 1:
  wherein, at the encoder, the method further comprises the steps of:
    analyzing each region of the current picture;
    segmenting the picture into one or more image regions based, at least in part, on the analyzing step;
    deriving at least one adaptive filter for each of the one or more segmented image regions;
    buffering the at least one adaptive filter in the at least one filter buffer; and
    sending the at least one adaptive filter for each of the one or more segmented image regions in a video bitstream that is received at the decoder, wherein the at least one adaptive filter is used to encode the each of the one or more segmented image regions.

8. The method as recited in claim 1 wherein:
  upon an encoder sending a new adaptive filter used for encoding the current picture or slice and a decoder receiving the new adaptive filter, the managing step further comprises the step of:
    at the encoder: sending an additional syntax in the video bitstream; and
    at the decoder: receiving the additional syntax in the video bitstream;
  wherein the additional syntax indicates whether the new adaptive filter is to be added to the filter buffer with which the new adaptive filter is associated, and at least one of:
    upon the additional syntax having a first of at least two values, adding the new adaptive filter to the filter buffer with which the new adaptive filter is associated based, at least in part, on the first value of the additional syntax, and buffering the new adaptive filter in the associated filter buffer; or
    upon the additional syntax having a second of the at least two values, maintaining a state of the filter buffer that is free of the new adaptive filter based, at least in part, on the second value of the additional syntax.

9. The method as recited in claim 1, wherein the managing step further comprises the steps of:
  determining a capacity state of the at least one filter buffer; and
  specifying a capacity size of each of the at least one filter buffer, wherein the capacity size of a first of the filter buffers is independent of the capacity size of a second of the filter buffers.

10. The method as recited in claim 1:
  wherein the step of encoding the current picture or slice with at least two (2) reference pictures comprises the steps of:
    accurizing a motion prediction relationship between the current picture or slice and each of the at least two (2) reference pictures; and
    offsetting a bit cost, which is associated with the independently signaling of the one or more of the adaptive filters for the first of the at least two reference pictures from the at least one adaptive filter for at least the second of the at least two reference pictures, with a reduction in an error energy that is associated with the accurized motion prediction relationship.

11. The method as recited in claim 1:
wherein one or more of the encoding step or the decoding step comprises the step of refining one or more adaptive filters.

12. The method as recited in claim 1 wherein at least one of the at least one filter buffer is established for at least one reference picture stored in a reference picture buffer.

13. A system, comprising:
means for establishing at least one filter buffer in one or more of a video encoder or a video decoder; and
means for buffering a plurality of adaptive filters in the at least one filter buffer, wherein the plurality of adaptive filters are used to perform one or more of motion interpolation, motion estimation, motion compensation, motion estimation interpolation, motion compensation interpolation, motion prediction interpolation or motion prediction of an encoding or decoding step;
means for encoding or decoding the current picture or slice with at least two (2) reference pictures, wherein one or more of the adaptive filters for a first of the at least two reference pictures are signaled independently from at least one of the adaptive filters for at least a second of the at least two reference pictures; and
means for tracking a usage count of each filter of the plurality of filters based on the encoding or decoding of the current picture or slice; and
means for managing the at least one filter buffer based on the tracking, wherein the managing means comprises:
means for arranging an order with which the plurality of adaptive filters are buffered in the at least one filter buffer wherein the order is arranged according to the usage count of each filter in the at least one filter buffer, and by sending an ordering syntax in a video bitstream from the encoder to the decoder, and by periodically re-ordering the plurality of adaptive filters in the at least one filter buffer dependent upon the usage count of each filter in the at least one filter buffer and upon the ordering syntax.

14. A video encoder, comprising:
at least one processor; and
a non-transitory computer readable storage medium that comprises encoded instructions, which cause, program or control the processor to perform, control or execute a process, the process comprising:
establishing at least one filter buffer in one or more of a video encoder or a video decoder; and
buffering a plurality of adaptive filters in the at least one filter buffer, wherein the plurality of adaptive filters are used to perform one or more of motion interpolation, motion estimation, motion compensation, motion estimation interpolation, motion compensation interpolation, motion prediction interpolation or motion prediction of an encoding or decoding step;
encoding or decoding the current picture or slice with at least two (2) reference pictures, wherein one or more of the adaptive filters for a first of the at least two reference pictures are signaled independently from at least one of the adaptive filters for at least a second of the at least two reference pictures; and
based on the encoding or decoding of the current picture or slice, tracking a usage count of each filter of the plurality of filters; and
based on the tracking, managing the at least one filter buffer, wherein the managing step comprises:
arranging an order with which the plurality of adaptive filters are buffered in the at least one filter buffer wherein the order is arranged according to the usage count of each filter in the at least one filter buffer, and by sending an ordering syntax in a video bitstream from the encoder to the decoder, and by periodically re-ordering the plurality of adaptive filters in the at least one filter buffer dependent upon the usage count of each filter in the at least one filter buffer and upon the ordering syntax.

15. A video decoder, comprising:
at least one processor; and
a non-transitory computer readable storage medium that comprises encoded instructions, which cause, program or control the at least one processor to perform, control or execute a process, the process comprising:
establishing at least one filter buffer in one or more of a video encoder or a video decoder;
buffering a plurality of adaptive filters in the at least one filter buffer, wherein the plurality of adaptive filters are used to perform one or more of motion interpolation, motion estimation, motion compensation, motion estimation interpolation, motion compensation interpolation, motion prediction interpolation or motion prediction of an encoding or decoding step; and
encoding or decoding the current picture or slice with at least two (2) reference pictures, wherein one or more of the adaptive filters for a first of the at least two reference pictures are signaled independently from at least one of the adaptive filters for at least a second of the at least two reference pictures; and
based on the encoding or decoding of the current picture or slice, tracking a usage count of each filter of the plurality of filters; and
based on the tracking, managing the at least one filter buffer, wherein the managing step comprises the step of:
arranging an order with which the plurality of adaptive filters are buffered in the at least one filter buffer wherein the order is arranged according to the usage count of each filter in the at least one filter buffer, and by sending an ordering syntax in a video bitstream from the encoder to the decoder, and by periodically re-ordering the plurality of adaptive filters in the at least one filter buffer dependent upon the usage count of each filter in the at least one filter buffer and upon the ordering syntax.

16. A computer apparatus, comprising:
at least one processor; and
a non-transitory computer readable storage medium that comprises encoded instructions, which cause, program or control the at least one processor to perform, control or execute a process, the process comprising:
establishing at least one filter buffer in one or more of a video encoder or a video decoder;
buffering a plurality of adaptive filters in the at least one filter buffer, wherein the plurality of adaptive filters are used to perform one or more of motion interpolation, motion estimation, motion compensation, motion estimation interpolation, motion compensation interpolation, motion prediction interpolation or motion prediction of an encoding or decoding step; and
encoding or decoding the current picture or slice with at least two (2) reference pictures, wherein one or more of the adaptive filters for a first of the at least two reference pictures are signaled independently from at least one of the adaptive filters for at least a second of the at least two reference pictures; and
based on the encoding or decoding of the current picture or slice, tracking a usage count of each filter of the plurality of adaptive filters; and
based on the tracking, managing the at least one filter buffer;

wherein the managing step comprises the step of:
arranging an order with which the plurality of adaptive filters are buffered in the at least one filter buffer wherein the order is arranged according to the usage count of each filter in the at least one filter buffer, and by sending an ordering syntax in a video bitstream from the encoder to the decoder, and by periodically re-ordering the plurality of adaptive filters in the at least one filter buffer dependent upon the usage count of each filter in the at least one filter buffer and upon the ordering syntax.

17. An integrated circuit (IC) device, comprising:
a semiconductor die;
an array of a plurality of active devices disposed within or upon the semiconductor die; and
a non-transitory data storage medium that comprises encoded instructions that are addressable to and readable by one or more of the active devices of the array, which instructions cause, program or control the one or more active devices to perform, control or execute a process, the process comprising:
establishing at least one filter buffer in one or more of a video encoder or a video decoder; and
buffering a plurality of adaptive filters in the at least one filter buffer wherein the plurality of adaptive filters are used to perform one or more of motion interpolation, motion estimation, motion compensation, motion estimation interpolation, motion compensation interpolation, motion prediction interpolation or motion prediction of an encoding or decoding step;
encoding or decoding the current picture or slice with at least two (2) reference pictures, wherein one or more of the adaptive filters for a first of the at least two reference pictures are signaled independently from at least one of the adaptive filters for at least a second of the at least two reference pictures; and
based on the encoding or decoding of the current picture or slice, tracking a usage count of each filter of the plurality of filters; and
based on the tracking, managing the at least one filter buffer, wherein the managing step comprises the step of:
arranging an order with which the plurality of adaptive filters are buffered in the at least one filter buffer wherein the order is arranged according to the usage count of each filter in the at least one filter buffer, and by sending an ordering syntax in a video bitstream from the encoder to the decoder, and by periodically re-ordering the plurality of adaptive filters in the at least one filter buffer dependent upon the usage count of each filter in the at least one filter buffer and upon the ordering syntax.

18. The IC device as recited in claim 17, wherein the IC device comprises at least one of:
a microprocessor;
a programmable logic device (PLD);
a field programmable gate array (FPGA);
a digital signal processor (DSP);
an application-specific IC (ASIC); or
a microcontroller.

19. The IC device as recited in claim 17 wherein the IC device comprises a component of one or more of:
a computer apparatus; or
a video apparatus.

20. A non-transitory computer readable storage medium comprising instructions, which when executed or performed by at least one processor, cause, program or control the at least one processor to perform, execute or control a process, the process comprising the steps of:
establishing at least one filter buffer in one or more of a video encoder or a video decoder;
buffering a plurality of adaptive filters in the at least one filter buffer wherein the plurality of adaptive filters are used to perform one or more of motion interpolation, motion estimation, motion compensation, motion estimation interpolation, motion compensation interpolation, motion prediction interpolation or motion prediction of an encoding or decoding step;
encoding or decoding the current picture or slice with at least two (2) reference pictures, wherein one or more of the adaptive filters for a first of the at least two reference pictures are signaled independently from at least one of the adaptive filters for at least a second of the at least two reference pictures; and
based on the encoding or decoding of the current picture or slice, tracking a usage count of each filter of the plurality of filters; and
based on the tracking, managing the at least one filter buffer;
wherein the managing step comprises the step of:
arranging an order with which the plurality of adaptive filters are buffered in the at least one filter buffer wherein the order is arranged according to the usage count of each filter in the at least one filter buffer, and by sending an ordering syntax in a video bitstream from the encoder to the decoder, and by periodically re-ordering the plurality of adaptive filters in the at least one filter buffer dependent upon the usage count of each filter in the at least one filter buffer and upon the ordering syntax.

* * * * *